United States Patent
Liu et al.

(10) Patent No.: US 10,859,982 B2
(45) Date of Patent: Dec. 8, 2020

(54) NETWORKED, CHANNELIZED POWER DISTRIBUTION, MONITOR AND CONTROL FOR SECURITY AND LIFE SAFETY APPLICATIONS

(71) Applicant: LIFESAFETY POWER, INC., Mundelein, IL (US)

(72) Inventors: Guang Liu, Lake Zurich, IL (US); Joseph M. Holland, Woburn, MA (US); Larry L. Ye, Lake Forest, IL (US); John F. Olliver, Lawrenceville, GA (US)

(73) Assignee: LIFESAFETY POWER, Libertyville, IL (US)

( * ) Notice: Subject to any disclaimer, the term of this patent is extended or adjusted under 35 U.S.C. 154(b) by 242 days.

(21) Appl. No.: 15/959,281

(22) Filed: Apr. 23, 2018

(65) Prior Publication Data
US 2018/0239310 A1    Aug. 23, 2018

Related U.S. Application Data

(63) Continuation of application No. 13/859,566, filed on Apr. 9, 2013, now Pat. No. 9,952,565.

(51) Int. Cl.
*G05B 13/02* (2006.01)
*G05B 15/02* (2006.01)
(Continued)

(52) U.S. Cl.
CPC ............. *G05B 13/02* (2013.01); *G05B 15/02* (2013.01); *G06F 11/0766* (2013.01); *G05B 9/02* (2013.01);
(Continued)

(58) Field of Classification Search
CPC ..... G06F 1/32; G06F 1/26; G06F 1/28; G05B 13/02
See application file for complete search history.

(56) References Cited

U.S. PATENT DOCUMENTS

| 5,033,112 A | 7/1991 | Bowling et al. |
| 5,694,509 A | 12/1997 | Uemura et al. |

(Continued)

OTHER PUBLICATIONS

Simplex Brochure, Life Alarm Fire Alarm Controls, S4009-001-9, (Aug. 1999).

(Continued)

*Primary Examiner* — Keshab R Pandey
(74) *Attorney, Agent, or Firm* — Cygan Law Offices P.C.; Joseph T. Cygan

(57) ABSTRACT

An apparatus includes a plurality of power distribution control output channels operatively coupled to at least one power source, and comprising an access control input from an access control device, and a control output for a controlled device. A controller receives an access control input signal for each power distribution control output channel and provides a control signal to each power distribution control output channel such that each power distribution control output channel provides a control output signal according to requirements of a corresponding controlled device. The controller can individually isolate one or more power distribution control output channels from the at least one power source such that the control output signal is removed from the corresponding controlled device, while any other power distribution control output channels coupled to the same power source continues to operate without interruption.

6 Claims, 23 Drawing Sheets

(51) Int. Cl.
  *G06F 11/07* (2006.01)
  *G07C 9/00* (2020.01)
  *G06F 11/20* (2006.01)
  *G05B 9/02* (2006.01)

(52) U.S. Cl.
  CPC ...... *G06F 11/0796* (2013.01); *G06F 11/2015* (2013.01); *G07C 9/00571* (2013.01)

(56) References Cited

U.S. PATENT DOCUMENTS

| | | | |
|---|---|---|---|
| 5,929,609 A * | 7/1999 | Joy | H02J 7/1446 |
| | | | 322/23 |
| 5,995,946 A | 11/1999 | Auzenne et al. | |
| 6,031,354 A | 2/2000 | Wiley et al. | |
| 6,058,494 A * | 5/2000 | Gold | G06F 11/073 |
| | | | 714/42 |
| 6,366,211 B1 | 4/2002 | Parker | |
| 6,946,972 B2 | 9/2005 | Mueller et al. | |
| 7,184,905 B2 | 2/2007 | Stephan | |
| 7,274,305 B1 | 9/2007 | Luttrell | |
| 7,391,315 B2 | 6/2008 | Friar | |
| 7,446,654 B2 | 11/2008 | Addy | |
| 7,447,117 B2 | 11/2008 | Yang | |
| 7,706,928 B1 | 4/2010 | Howell et al. | |
| 7,711,814 B1 | 5/2010 | Emerick et al. | |
| 7,719,415 B2 | 5/2010 | Dahl et al. | |
| 2002/0167080 A1 * | 11/2002 | Barber | H01L 25/16 |
| | | | 257/685 |
| 2003/0028827 A1 | 2/2003 | Gray | |
| 2004/0002792 A1 | 1/2004 | Hoffknecht | |
| 2005/0071093 A1 | 3/2005 | Stefan | |
| 2005/0289373 A1 * | 12/2005 | Chapuis | G06F 1/26 |
| | | | 713/300 |
| 2006/0203524 A1 | 9/2006 | Ohno et al. | |
| 2007/0076340 A1 | 4/2007 | Ewing et al. | |
| 2007/0085676 A1 | 4/2007 | Lee et al. | |
| 2008/0218148 A1 | 9/2008 | Robertson et al. | |
| 2008/0231119 A1 * | 9/2008 | Yeh | H02J 3/381 |
| | | | 307/65 |
| 2009/0001813 A1 * | 1/2009 | Berry | H02M 1/10 |
| | | | 307/31 |
| 2009/0089140 A1 | 4/2009 | Miyamoto | |
| 2010/0145542 A1 | 6/2010 | Chapel et al. | |
| 2010/0204960 A1 | 8/2010 | Hagadone et al. | |

OTHER PUBLICATIONS

Honeywell Brochure, Remote Booster Power Supplies, Specification Data, 74-3300-1 (2002).

GE Security, FireworX Fire & Life Safety Power Supplies, Data Sheet FX85005-0125, Issue 2, (2009).

Security Door Controls (SDC) 632RF 2 Amp Power Supply (Jul. 2008).

Supplementary European Search Report, European Patent Application No. EP 11 84 2062 (dated Oct. 23, 2015).

Examiner's Report, Canadian Patent Application No. CA2 814154 (dated Oct. 22, 2015).

* cited by examiner

- PRIOR ART -

- PRIOR ART -

Report Setting — 1200

- ☑ FP1 — 1201
- ☑ FP2 — 1202
- ☑ N AC1 — 1203
- ☑ N AC2 — 1204
- ☑ N AC3 — 1205
- ☑ N AC4 — 1206
- ☑ MCU — 1207

Device ID — 1301

FP1

☐ Check/uncheck ALL — 1303

| | Parameter | 1302 |
|---|---|---|
| | Model number | |
| ☑ | System fault status | |
| ☑ | AC fault status | |
| ☑ | FAI status | |
| ☑ | Output latching on FAI | |
| ☑ | Output voltage | |
| ☑ | Battery voltage | |
| ☑ | Battery charge current | |
| ☑ | Total power up time | |
| ☑ | Battery installed time | |
| ☑ | # of AC faults detected | |
| ☑ | # of system faults detected | |

| Site ID |
|---|
| Main building |

1402

| | Parameter |
|---|---|
| ☑ | Cabinet internal temperature |
| ☑ | Hall current sensor 1 |
| ☑ | Hall current sensor 2 |
| ☑ | Hall current sensor 3 |
| ☑ | ADC voltage 1 |
| ☑ | ADC voltage 2 |
| ☑ | ADC voltage 3 |
| ☑ | Event 1 status |
| ☑ | Event 2 status |
| ☑ | PWM output 1 |
| ☑ | PWM output 2 |
| ☑ | Logic output 1 |
| ☑ | Logic output 2 |

1403

☐

Check/uncheck ALL

*FIG. 14*

| MCU signal | Assigned name |
|---|---|
| Site ID | Main building |
| Hall Sensor 1 | Battery Current |
| Hall Sensor 2 | FP1 output current |
| Hall Sensor 3 | FP2 output current |
| ADC1 reading | Battery voltage |
| ADC2 reading | NAC1 output1 voltage |
| ADC3 reading | NAC1 output2 voltage |
| Event1 | Front door alarm |
| Event2 | Back door alarm |
| PWM1 | PWM1 |
| PWM2 | PWM2 |
| Logic_OUT1 | Camera1 enable |
| Logic_OUT2 | Camera2 enable |

1700

| PWM Ch. (1751) | Frequency (1752) | Duty (%) (1753) |
|---|---|---|
| PWM1 | 20 kHz ▽ | 50 |
| PWM2 | 120 Hz ▽ | 100 |

1701

| Logic Output (1754) | Set Value (1755) |
|---|---|
| Output 1 | Low ▽ |
| Output 2 | High ▽ |

| Select (1871) | Warning Type (1872) | Battery Parameter (1873) | Value (1874) | Unit (1875) |
|---|---|---|---|---|
| ☑ | End of Life warning | Rated battery life | 4 | Years |
| ☑ | Battery low warning | Rated Amp-Hour | 36 | A-H |

| Input | User Program Settings | | | | Output | | |
|---|---|---|---|---|---|---|---|
| Control Input State | Control Input Type | Output Load Type | Unlock on AC Loss | Unlock on FAI | Relay Coil Energize | Output Voltage ON/OFF | Input Status Display |
| Open | NO or V | Fail-Safe | No | No | OFF | ON | Inactive |
| Open | NO or V | Fail-Secure | No | No | ON | OFF | Inactive |
| Open | NC or OC | Fail-Safe | No | No | ON | OFF | Active |
| Open | NC or OC | Fail-Secure | No | No | OFF | ON | Active |
| Closed | NO or V | Fail-Safe | No | No | ON | OFF | Active |
| Closed | NO or V | Fail-Secure | No | No | OFF | ON | Active |
| Closed | NC or OC | Fail-Safe | No | No | OFF | ON | Inactive |
| Closed | NC or OC | Fail-Secure | No | No | ON | OFF | Inactive |
| Don't care | Don't care | Constant ON | No | No | OFF | ON | Disabled |

2110 — Input column
2120 — User Program Settings columns

2200

| Input | | | | User Program Settings | | | Output | |
|---|---|---|---|---|---|---|---|---|
| AC Loss | FAI pin | Control Input State | Control Input Type | Output Load Type | Unlock on AC Loss | Unlock on FAI | Relay Coil Energize | Output Voltage ON/OFF |
| Don't care | Low | Don't care | Don't care | Fail-Safe | Don't care | Yes | ON | OFF |
| Don't care | Low | Don't care | Don't care | Fail-Secure | Don't care | Yes | OFF | ON |
| Yes | Don't care | Don't care | Don't care | Fail-Safe | Yes | Don't care | ON | OFF |
| Yes | Don't care | Don't care | Don't care | Fail-Secure | Yes | Don't care | OFF | ON |
| Don't care | Low | Don't care | Don't care | Constant ON | Don't care | Yes | ON | OFF |
| Yes | Don't care | Don't care | Don't care | Constant ON | Yes | Don't care | ON | OFF |
| Don't care | Don't care | Don't care | Don't care | Don't care | No | No | No change | No change |

| HOME | Reporting | Configure | Tools | | | | | | | |
|---|---|---|---|---|---|---|---|---|---|---|
| | | Site ID | M8 TEST @ BG OFFICE | | | | | | Ver: 6.00-42 | |
| Device ID: | M8-1 | Date | Mon Apr 01 2013 | | | Time | 10:56:31 | | | |
| | | | Model: M8 | | AC Power: ON | | | Programming | Return | |
| Output # | Output Description | Voltage (V) | Current (A) | Power (W) | Power Ready | Control Input | FAI State | Output Status | | |
| □ 1 | Door1-Folger Adam | 25.166 | 0.180 | 4.530 | Yes | Inactive | Active | Normal | | |
| □ 2 | Door2-Adams Rite | 25.196 | 0.193 | 4.863 | Yes | Active | Active | Normal | | |
| □ 3 | Door3-Adams Rite | 25.255 | 0.206 | 5.203 | Yes | Active | Active | Normal | | |
| □ 4 | Door4-Adams Rite | 25.225 | 0.193 | 4.868 | Yes | Active | Active | Normal | | |
| □ 5 | Door5-HES1006 | 12.256 | 0.412 | 5.049 | Yes | Active | Active | Normal | | |
| □ 6 | Door6-HES1006 | 12.227 | 0.399 | 4.879 | Yes | Active | Active | Normal | | |
| □ 7 | Door7-HES1006 | 12.227 | 0.412 | 5.038 | Yes | Active | Active | Normal | | |
| □ 8 | Door8-Folger Adam | 25.225 | 0.167 | 4.213 | Yes | Active | Active | Normal | | |
| Rev.0.20 | Enable Selected Output | Disnable Selected Output | | | Enable All Output | Disable All Output | | Save Setting | | |

NETWORKED, CHANNELIZED POWER DISTRIBUTION, MONITOR AND CONTROL FOR SECURITY AND LIFE SAFETY APPLICATIONS

CROSS-REFERENCE TO RELATED APPLICATIONS

The present patent application is a Continuation of co-pending U.S. patent application Ser. No. 13/859,566 entitled "NETWORKED, CHANNELIZED POWER DISTRIBUTION, MONITOR AND CONTROL FOR SECURITY AND LIFE SAFETY APPLICATIONS," filed Apr. 9, 2013, which is a Continuation-in-Part of U.S. Pat. No. 8,566,651 issued Oct. 22, 2013, application Ser. No. 12/946,287, entitled "APPARATUS AND METHOD FOR A NETWORKED POWER MANAGEMENT SYSTEM FOR SECURITY AND LIFE SAFETY APPLICATIONS," filed Nov. 15, 2010, the amended specifications duplicated herein, and which are hereby incorporated by reference herein in their entirety.

FIELD OF THE DISCLOSURE

The present disclosure relates generally to power supply systems for security and life safety equipment (access control, security surveillance camera, fire and burglary alarm systems, mass notification equipment, etc.) and more particularly to apparatuses and methods providing remotely accessible power supply systems and power distribution and control systems.

BACKGROUND

Power supplies with battery backup and basic fault reporting means for security and life safety systems have been in existence for decades. These power supply systems provide some mechanism for basic fault detection and reporting as required by industry specifications. Most commonly, visual indicators and relay contacts are the primary means for fault notification. In these traditional power supply systems, power system control or parameter change necessitates direct physical change of the device by an on-site technician and cannot be done otherwise. Examples of existing power supply systems with this kind of fault notification are illustrated in FIG. 1 and FIG. 2.

FIG. 1 provides a simplified block diagram of an existing power supply system 100. In FIG. 1, a complete power supply/charger board 101 includes an isolated AC-DC power converter 102 which is a power supply that converts AC power into isolated 12V or 24V DC power outputs. The DC output from the isolated AC-DC converter 102 is sent to one or more output terminals under the control of control and fault detection circuitry 103. For example, DC is provided to three pairs of output terminals DC1, DC2 and DC3 as shown. DC1 is a normal constant-on output while the DC2 and DC3 outputs are controlled by a Fire Alarm Interface (FAI) signal (not shown). The DC2 output is on when the FAI signal is inactive and DC3 is on when the FAI signal is active. The control and fault detection circuitry 103 also detects faults in the system including loss of AC power (AC Fault), and system faults. The system faults include "output voltage out of range" and "battery not present." The control and fault detection circuitry 103 also handles the battery power transfer in event of an AC power outage. Charger 104 charges the battery 107 and maintains it at near full capacity when AC power is normal. The system fault relay 105 and AC fault relay 106 are normally energized, that is, energized when there is no fault condition present. When AC power is lost, the AC fault relay 106 is de-energized, causing a change in the contact state and either closing or opening its various provided output contacts. The output contacts can be used to signal some upper level control device to react to the fault condition. Similarly, when any one of the system faults occurs, the system fault relay 105 will change its contact states and thereby notify an upper control device of the fault condition. The LED indicators 108 are a group of LED indicators that are utilized to indicate the presence of AC input, DC output, specific fault conditions and FAI signal status. For example, one green LED may indicate AC power present, a second green LED may indicate DC1 output normal, a third green LED may indicate that either DC2 or DC3 has power, a red LED may indicate FAI activation, a yellow LED may indicate an AC Fault, a second yellow LED may indicate a system fault and a third yellow LED may indicate a reverse battery condition.

FIG. 2 provides a simplified block diagram of another existing power supply system 200. The functionality of the power supply system 200 is similar to the power supply system 100, except that the power supply system 200 does not have an FAI interface and does not provide the two FAI controlled DC outputs (DC2 and DC3). In FIG. 2, the FAI signal is input to a Notification Appliance Circuit (NAC) power control board 209. The power to the NAC power control board 209 is provided by the DC input DC1 from the main power supply board 201 as shown.

A drawback of the traditional existing power systems described above and exemplified in FIG. 1 and FIG. 2, is that service personnel must be on site to troubleshoot every fault condition, and to perform periodic maintenance. For example, nowadays a security company may manage thousands of security cameras spread out in many different buildings. Sometimes those cameras can get stuck and require the power to be cycled (i.e. reset the camera). The security company has to send technicians to the field to reset every camera that gets stuck.

Another problem with traditional existing power systems involves battery maintenance. To ensure the battery is functioning properly, a service technician must go to every job site to test the battery operation at a certain period of time.

Another drawback of these traditional existing power systems is that they do not provide system operating parameters and therefore it is difficult to detect potential failures before the failure happens.

This issue also presents itself within the area of power distribution and output control in existing power supply systems for security and life safety applications because these systems cannot be remotely monitored and controlled. If a device connected to the distribution and control output is about to fail, there is no way to tell in existing systems. This creates problems for some highly sensitive applications such as, for example, security equipment in banks, or other similar institutions requiring high security among other examples.

One specific problem is that when a security device connected to the power distribution system output seizes up or otherwise gets stuck, a power cycle is required to reset the device. In this case, the power supply system will have to cycle power for all the security devices connected to the common power supply which requires temporarily taking all security devices using that power supply "off-line." Among other concerns, removing power to all devices in this manner causes problems because some sensitive equipment cannot tolerate power interruption. A specific problem for security systems is that access controls are temporarily disabled causing a security risk during the reset.

BRIEF DESCRIPTION OF THE DRAWINGS

FIG. 12 is a diagram of a report setting page of the GUI in accordance with an embodiment.

FIG. 13 is a diagram of a power supply/charger (FP1) report setting page of the GUI in accordance with an embodiment.

FIG. 14 is a diagram of an MCU parameter report setting page of the GUI in accordance with an embodiment.

FIG. 17 is a diagram of a PWM setting page and a logic output setting page of the GUI in accordance with an embodiment.

FIG. 18 is a diagram of a battery setting page of the GUI in accordance with an embodiment.

FIG. 21 is an example truth table 2100 for controlled output devices, using relays as the output devices, and GUI display variables, when the fire alarm (FAI signal) is not activated and when AC power is on.

FIG. 22 is an example truth table for controlled output devices, using relays as the output devices, when the fire alarm (FAI signal) is active, or when AC power is off

FIG. 24 is an example GUI status page for a channelized power distribution control apparatus with 8-channel outputs in accordance with an embodiment.

FIG. 25 is an example GUI programming page for a channelized power distribution control apparatus with 8-channel outputs in accordance with an embodiment.

DETAILED DESCRIPTION

Figure 1:
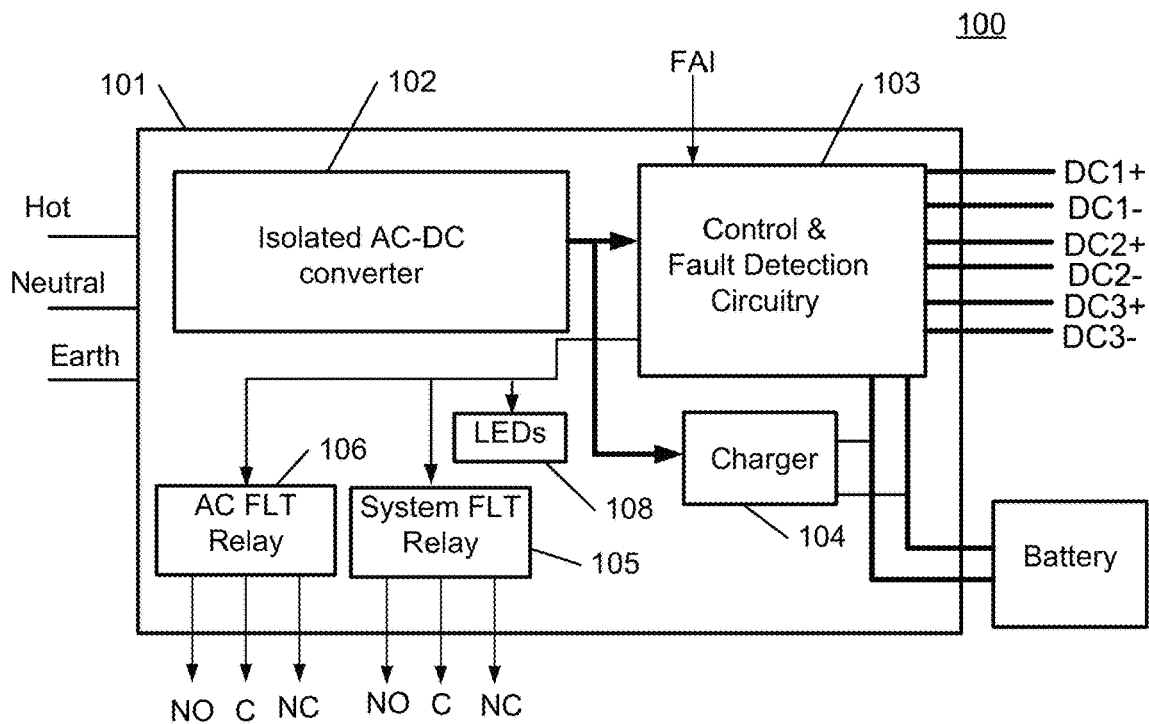
FIG. 1 is a block diagram providing an example of an existing power management system.
Figure 2:
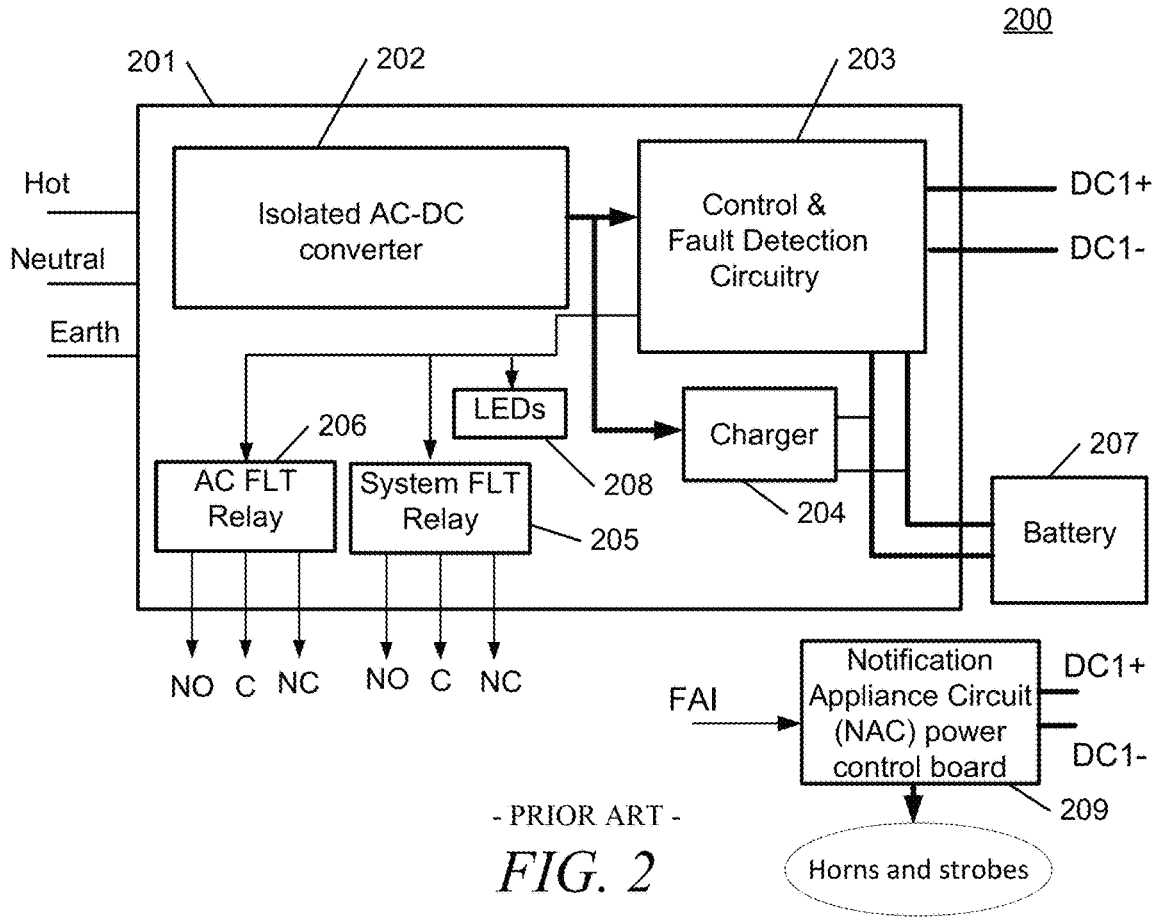
FIG. 2 is a block diagram providing another example of an existing power management system.

The present disclosure provides an apparatus with a plurality of power distribution control output channels. Each channel is operatively coupled to at least one power source, and has an access control input from an access control device, and a control output for a controlled device. A controller is operatively coupled to the plurality of power distribution control output channels. The controller is operative to receive an access control input signal for each power distribution control output channel, and to provide a control signal to each power distribution control output channel such that each power distribution control output channel provides a control output signal according to requirements of a corresponding controlled device that corresponds to the respective power distribution control output channel. The requirements may be specified by user settings entered into a user interface on a remote device and sent to the controller over a network interface.

The controller is further operative to individually isolate at least one power distribution control output channel from the at least one power source such that the control output signal is removed from the corresponding controlled device, while any other power distribution control output channel of the plurality of power distribution control output channels that is operatively coupled to the same at least one power source continues to operate without interruption.

In one embodiment, each power distribution control output channel may consist of an output device which has an input operatively coupled to at least one power source and also operatively coupled to the controller. The power distribution control output channel may also include a voltage detector connected to the output device input, and also operatively coupled to the controller. Voltage and current sensing circuitry may also be present in the embodiment and is operatively coupled to an output of the output device, and is also operatively coupled to the controller.

In some embodiments, the controller is operative to monitor input voltage of the output device using the voltage detector and monitor output voltage and output current of the output device using the voltage and current sensing circuitry such that the controller can determine that a controlled device corresponding to the output device is operating within a required voltage range or a required current range to anticipate failures of the controlled device. The controller may determine that the controlled device corresponding to the output device is not operating with the required voltage range or the required current range and send a warning message to a remote device over a network interface.

Each power distribution control output channel may further include an optical coupler connected to the access control input and to the controller. A second optical coupler may be connected to the controller and to a fire alarm system output, while a third optical coupler may be connected to the controller to provide a fault indication signal output. A light emitting diode (LED) may be connected to the controller to provide a visual indication when the controller detects a fault condition on at least one of the power distribution control output channels.

In some embodiments, the apparatus also includes data manager and interface logic that is operatively coupled to the controller and to the at least one power source. The data manager and interface logic is operative to, among other things, obtain status information from the controller for each power distribution control output channel, including measured parameters and alert condition notifications related to power distribution control output channel faults, controlled device faults or potential controlled device failure. The data manager and interface logic may write and email reports conforming to a plurality of configurable report settings in response to occurrence of an alert condition or a specified reporting interval. The data manager and interface logic may also obtain settings updates for each power distribution control output channel from a remote device over a network interface port, and provide the settings updates to the controller.

In some embodiments of a disclosed apparatus, the data manager and interface logic monitors the at least one power source for loss of AC power and sends a loss of AC power indication to the controller.

The disclosed embodiments include the methods of operation briefly described above. Thus, in one example method of operation a power management system receives an access control input signal for each power distribution control output channel of a plurality of power distribution control output channels, and provides a control signal to each power distribution control output channel such that each power distribution control output channel provides a control output signal according to requirements of a corresponding controlled device that corresponds to the respective power distribution control output channel. Also, the method of operation may include individually isolating at least one power distribution control output channel from at least one power source such that the control output signal is removed from the corresponding controlled device, while any other power distribution control output channel of the plurality of power distribution control output channels that is operatively coupled to the same at least one power source continues to operate without interruption.

The present disclosure provides an apparatus that includes a data manager and interface logic with a plurality of interface ports including at least one network interface port. The data manager and interface logic is operative to obtain digital and analog data, via the plurality of interface ports, from a plurality of digital and analog device types, where the data includes device operating parameters and alert condition notifications related to device faults or potential device failure. The data manager and interface logic is also operative to write and email a report conforming to a plurality of configurable report settings in response to occurrence of a device alert condition or a specified reporting interval, obtain updates to the device operating parameters from a remote device over the at least one network interface port, and provide the updates to corresponding devices over the plurality of interface ports. The data manager and interface logic may also provide a navigable graphical user interface accessible by a remote device and operable to receive inputs and provide the inputs to the data manager and interface logic over the network interface port. The data manager and interface logic may also detect and identify each device of the plurality of digital and analog device types, determine an alert condition for each device, and write and email the report individually for each device in response to occurrence of a device alert condition for a corresponding individual device.

The present disclosure also provides a computer readable memory storing executable instructions for execution by at least one processor, that when executed cause the at least one processor to perform the various disclosed methods of operation that are described briefly above and in detail herein below. The computer readable memory may be any suitable non-volatile memory such as, but not limited to, programmable chips such as EEPROMS, flash ROM (thumb drives), compact discs (CDs), digital video disks (DVDs), etc., that may be used to load executable instructions or program code to devices such as, but not limited to, those described in further detail herein below.

The present disclosure also provides an apparatus having at least one processor, and memory operatively coupled to the processor, wherein the memory contains instructions for execution by the at least one processor, such that the at least one processor upon executing the instructions is operable to provide a power management system configuration graphical user interface (GUI) for display on a remote device in communication with the at least one processor over a network. The GUI includes a navigable initial page having a plurality of selections; a plurality of input pages, navigable to by selecting corresponding selections of the plurality of selections of the navigable initial page, the input pages including inputs for configuring alert conditions triggering email output notifications, sender email account settings, recipient email address settings, email report content settings, and device parameter settings for a plurality of power management system devices including a power supply, a battery charger, and a plurality of power distribution control output channels.

The disclosed embodiments allow a system operator to monitor critical system parameters in real time. A system operator may program email alert trigger conditions so that an alert email will be sent out automatically when the trigger condition is met. The embodiments also enable an operator to set or change operating parameters of the power management system remotely.

Among the various advantages is the realization of significant cost savings in system maintenance by implementing a method to remotely obtain information necessary to diagnose a potential problem and change the operating parameters from a remote location. That is, the embodiments enable advance notification of a pending problem by a remote report generating capability thus providing the benefit of implementing preventative maintenance measures prior to direct failure of the system.

Figure 3:
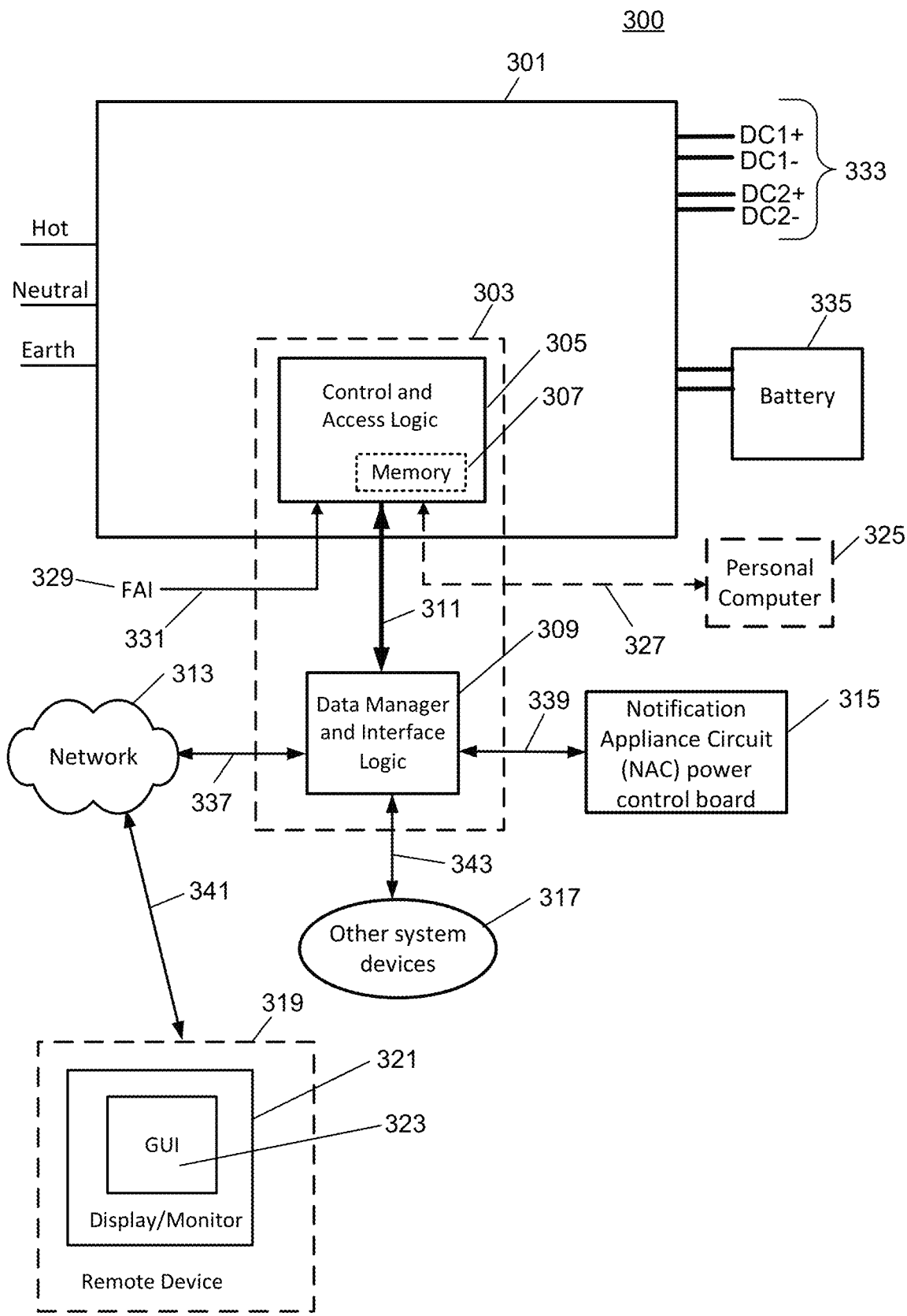
FIG. 3 is a diagram of a power management system in accordance with the embodiments.

Turning now to the drawings wherein like numerals represent like components, FIG. 3 illustrates a power management system 300 in accordance with the embodiments. The power management system 300 includes a main power supply/charger board 301 which provides DC voltage outputs 333 and which is connected to a battery 335. The power management system 300 of the embodiments includes a control, access and interface (CAI) apparatus 303. The CAI apparatus 303 may be physically located on the main power supply/charger board 301 in some embodiments, or, in other embodiments, may consist of portions where one portion is located on the power supply/charger board 301 and another portion is located off-board and operatively coupled via an interface 311. For example, as shown in FIG. 3, the CAI apparatus 303 may include control and access logic 305, which may be physically located on the main power supply/charger board 301 and operatively coupled to an external data manager and interface logic 309 via the interface 311.

The CAI apparatus 303 is operative to receive a Fire Alarm Interface (FAI) signal 329 over a coupled FAI interface 331, and is also operatively coupled to other system devices 317 via an interface 343. For example, the control and access logic 305 may receive the FAI signal 329 and the data manager and interface logic 309 may be operatively coupled to the other system devices 317. The data manager and interface logic 309 may be operatively coupled to a Notification Appliance Circuit (NAC) power control board 315 over an interface 339. The NAC power control board 315 receives DC voltage inputs 363 which may be provided by the main power supply/charger board 301. The data manager and interface logic 309 may also provide connectivity to a network 313 over an interface 337 to provide remote access in accordance with the embodiments.

For example, in accordance with the embodiments, a remote device 319 may connect to the network 313 over connectivity 341 and access features, parameters, settings, etc. of the power management system 300 such as, but not limited to, parameters and/or settings of the main power supply/charger board 301, parameters and/or settings of the other system devices 317 and parameters and/or settings related to the NAC power control board 315. The remote device may be any suitable connectable device having a display or monitor 321 suitable for displaying a graphical user interface (GUI) 323. For example, the remote device 319 may be a personal computer (PC), laptop, tablet PC, mobile phone, etc., in accordance with the embodiments. The GUI 323 is accessible by the remote device 319 by using a browser, such as a Web browser, and is navigable to various pages such as Web pages. The remote device 319 may also, in accordance with the embodiments, receive email reports related to the parameters and/or settings of the power management system 300.

The control and access logic 305 and the data manager and interface logic 309 may be implemented in various ways in accordance with the embodiments. That is, the "logic" disclosed herein, in accordance with the embodiments, may be implemented using one or more programmable processors with software and/or firmware executing thereon, ASICs, DSPs, hardwired logic or combinations thereof. Additionally, the control and access logic 305 and the data manager and interface logic 309 may include integrated and/or external memory used to store various software and/or firmware modules, in accordance with the embodiments, where such modules include executable instructions for execution by one or more programmable processors. For example, control and access logic 305 may include an integrated memory 307 as shown in FIG. 3.

The CAI apparatus 303 also provides an access interface 327 for access by a remote device such as personal computer (PC) 325, which may be a tablet, laptop, or any other suitable computing device including handheld computing devices. In some embodiments, the PC 325 may connect via access interface 327 to the control and access logic 305. The PC 325 may then access parameters and/or settings of the power management system 300 in accordance with the embodiments. The PC 325 may also access the GUI 323 using a browser, such as a Web browser.

Figure 4A:
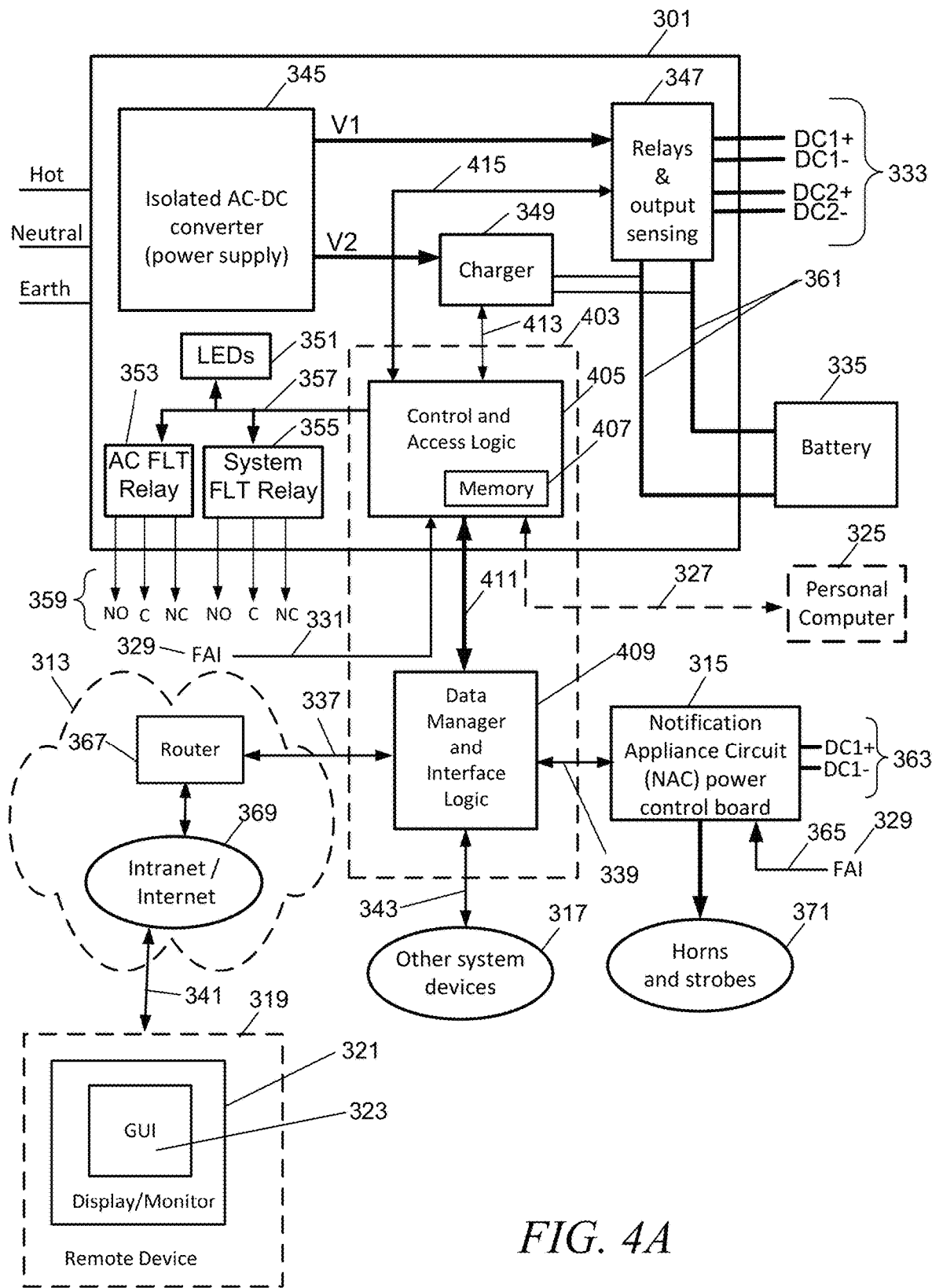
FIG. 4A is a diagram of a power management system in accordance with one embodiment.

FIG. 4A provides details of a power management system 400 in accordance with one embodiment. In the embodiment illustrated in FIG. 4A, the CAI apparatus 403 includes a control and access logic 405 which may be a microcontroller and which may include memory 407. The memory 407 may be an on-chip EEPROM in some embodiments. The control and access logic 405 is operatively coupled to data manager and interface logic 409, which also provides a network interface capability, for example an Ethernet interface capability, wireless network interface such as Wi-Fi, and/or some other suitable network interface, in the exemplary embodiment of FIG. 4A. The interface 411 operatively coupling the control and access logic 405 to the data manager and interface logic 409 may be a serial interface and may be a Serial Peripheral Interface (SPI) in some embodiments. The control and access logic 405 is also operatively coupled to battery charger 349 via an interface 413 which may include a digital-to-analog converter, a filtered PWM signal, analog-to-digital converters, GPIO pins or a serial interface. The control and access logic 405 is operative to receive setting parameter data from the charger 349, and may send configuration or setting commands to the charger 349 to control operation. The control and access logic 405 is also operatively coupled to the isolated AC-DC converter 345 which is also referred to herein as a "power supply" or as "power supply 345." The control and access logic 405 receives, among other things, voltage information from the power supply 345 via an interface 415. The interface 415 provides multiple control and data lines to both receive information and to send control signals. In other words, the control and access logic 405 may receive, among other information, voltage information from the power supply 345 via a voltage divider output, where the voltage divider is located in the relays and output sensing unit 347. The control and access logic 405 is also operative to provide relay control commands to relays and output sensing unit 347 in order to switch the power management system 400 to battery 335 power in the event of a power supply 345 fault condition or a loss of AC power. The relays and output sensing unit 347 is operatively coupled to the battery 335 via the battery leads 361 and may have internal voltage and current sensors coupled to one or both of the battery leads 361.

The control and access logic 405 is also operatively coupled to on-board LEDs 351 and to AC fault relay 353 and System fault relay 355, over an interface 357. The AC fault relay 353 and System fault relay 355 provide sets of output contacts 359 that may include normally open (NO), normally closed (NC) or continuous voltage (C) type outputs. The control and access logic 405 is operative to turn specific LEDs of the LEDs 351 on or off in response to appropriate conditions. The control and access logic 405 likewise is operative to send relay control signals to AC fault relay 353 and System fault relay 355 over the interface 357.

The power management system 400 includes the main power supply/charger board 301. The main power supply/charger board 301 includes the isolated AC-DC converter 345 (or "power supply 345") which provides two DC power outputs V1 and V2. The V1 output is a main DC power output and the V2 output is provided to a battery charger 349 which includes related battery charger circuitry. The V1 main DC power output is provided to relays and output sensing unit 347, and may be used to provide input to a voltage divider to provide an appropriate voltage level as a sensing input to the control and access logic 405 over interface 415. A battery 335 is operatively coupled to the charger 349 and to the relays and output sensing unit 347. The battery 335 is rechargeable and supplies power in the event of an AC power outage. Additionally, in accordance with the embodiment illustrated in FIG. 4A, the battery voltage and current can be monitored via the control and access logic 405.

In the embodiment illustrated in FIG. 4A, the data manager and interface logic 409 is operatively coupled to the Notification Appliance Circuit (NAC) power control board 315. The NAC power control board 315 obtains power from the main power supply/charger board 301 and receives an FAI signal 329 from a Fire Alarm Control Panel (FACP) (not shown) via an interface 365. The output of the NAC power control board 315 drives and synchronizes multiple horns and strobes 371 when an FAI signal 329 is received over the Fire Alarm Interface (FAI) 365.

In accordance with the embodiment illustrated in FIG. 4A, a personal computer (PC) 325, or other suitable computing device, may be connected to the main power supply/charger board 301 to configure the main power supply/charger board 301 and to observe critical parameters of the isolated AC-DC converter 345 and charger 349. The PC 325 may be connected to the control and access logic 405 via a serial link as the access interface 327. It is to be understood that the PC 325 is not connected to the power management system 400 permanently, but is only connected during installation or servicing.

The control and access logic 405, in accordance with the exemplary embodiment shown in FIG. 4A, is operative to perform various logic control functions such as fault detection and protection, including detecting "input voltage out of range," "output voltage out of range," "output over-load/short circuit," "battery not present," "output positive" or "negative short to earth ground," and "over-temperature." The control and access logic 405, in accordance with the exemplary embodiment, is also operative to control the DC2 output, of DC outputs 333, based on FAI signal 329 status (for example, can be set to "fail safe" or "fail secure" mode). The control and access logic 405 is also operative to program the charger 349 output current, perform battery power and AC power transfer, control the system fault relay 355 and AC fault relay 353, control LED indicators 351, and provide serial communication via interface 411, via for example a serial link, SPI, I²C or UART, to the data manager and interface logic 409 and to the PC 325.

The data manager and interface logic 409, in the exemplary embodiment of FIG. 4A, provides, among other things, a network interface such as an Ethernet interface and may be connected to the network 313 via a router 367 coupled using, for example, an Ethernet cable for the interface 337. The data manager and interface logic 409 may also be connected to other system devices 317 for the purpose of data collection and control.

Critical power supply parameters are sensed by the control and access logic 405 and stored in the memory 407, which may be an on-chip EEPROM in some embodiments as was mentioned above. The critical parameters are saved periodically (for example, hourly) and at the instance when any fault condition is detected. Table 1 provides a list of the parameters that may be stored in memory 407.

TABLE 1

Parameters stored in memory for user and service personnel access

| Variable Description | Number of bytes | Variable type | Access | Variable range | comments |
|---|---|---|---|---|---|
| Device ID | 1 | Unsigned integer | User: Read only Svc: read only | 0-255 | This is device identification |
| Model number | 1 | Unsigned integer | User: Read only Svc: read only | 0-255 | Mapped to actual model number of power supply. |
| Total Power-on Time in hours | 3 | Unsigned integer | User: Read only Svc: read only | 0-16777215 | This datum is useful during customer return servicing |
| Total number of AC FLT relay activation | 2 | Unsigned integer | User: Read only Svc: Read/Write | 0-65535 | This datum is useful during customer return servicing |
| Total number of SYS FLT relay activation | 2 | Unsigned integer | User: Read only Svc: Read/Write | 0-65535 | This datum is useful during customer return servicing |
| Total battery connection time in hours | 3 | Unsigned integers | User: Read/Write Svc: Read/Write | 0-16777215 | User resettable when replacing battery. |
| AC fault reporting delay in Hr:Min:Sec | 3 | Unsigned integers | User: Read/Write Svc: Read/Write | Second: 0-60 Minute: 0-60 Hour: 0-255 | User programmable delay time (overwriting the default value) |
| System fault reporting delay in Hr:Min:Sec | 3 | Unsigned integer | User: Read/Write Svc: Read/Write | Second: 0-60 Minute: 0-60 Hour: 0-255 | User programmable delay time (overwriting the default value). |
| Charging current scaler N (Default current divided by | 1 | Unsigned integer | User: Read/Write Svc: Read/Write | 0-4 (minimum charge current is | User programmable charging current, scaled to ½, ¼, |

TABLE 1-continued

Parameters stored in memory for user and service personnel access

| Variable Description | Number of bytes | Variable type | Access | Variable range | comments |
|---|---|---|---|---|---|
| $2^N$) | | | | 1/16 of the full current) | 1/8 or 1/16 of the default/nominal current (over-writing the default value). |
| Power supply status word | 4 | hex | User: Read only Svc: Read only | 00000000-FFFFFFFF | Updated every period & when main output relay is shut off due to fault. |
| Battery voltage | 2 | Unsigned integers | User: Read only Svc: Read only | 0 to 1023 | Battery voltage reading from 10-bit ADC |
| Charger current | 2 | Unsigned integers | User: Read only Svc: Read only | 0 to 1023 | Charger output current reading from 10-bit ADC |
| Charger current offset | 2 | Unsigned integers | User: Read only Svc: Read only | 0 to 1023 | Battery current offset value (charger current ADC reading when charging current is 0). |
| Fault pin voltage | 2 | Unsigned integers | User: Read only Svc: Read only | 0 to 1023 | Fault pin voltage reading from 10-bit ADC |
| AC feedback voltage | 2 | Unsigned integers | User: Read only Svc: Read only | 0 to 1023 | AC feedback voltage reading from 10-bit ADC |
| Earth ground pin voltage | 2 | Unsigned integers | User: Read only Svc: Read only | 0 to 1023 | Earth ground pin voltage reading from 10-bit ADC |
| DC output voltage reading | 2 | Unsigned integers | User: Read only Svc: Read only | 0 to 1023 | DCout_AD pin voltage reading from 10-bit ADC |
| SMPS output voltage | 2 | Unsigned integers | User: Read only Svc: Read only | 0 to 1023 | Vout_AD pin voltage reading from 10-bit ADC |

In accordance with the embodiments, information from the power management system 400 and the main power supply/charger board 301 etc. may be conveyed and/or stored using a Power Supply Status Word (PSSW) that may consist of 4 bytes in some embodiments. For example, a PSSW may consist of two higher significant bytes and two lower significant bytes, where the two higher significant bytes are reserved for future use, and the two lower significant bytes have a format and utilization as illustrated in Table 2 below:

TABLE 2

Lower significant 16 bits of the PSSW

| Bit # | Bit Name | Description |
|---|---|---|
| 0 | EN VOUT | DC output enable: Hi = Output relay selects SMPS Lo = Output relay selects Battery |
| 1 | EN BAT | Battery SCR transition enable, positive logic: Hi = enable SCR Lo = disable SCR |
| 2 | EN_CHARGER | Enable charger, negative logic: Hi = Disable charger output Lo = Enable the charger output |
| 3 | EN_GNDFLT_LED | Enable ground fault reporting LED: Hi = GND fault LED turned on Lo = GND fault LED turned off |
| 4 | Vout_DETECT | Output voltage setting detection (12 or 24 V setting): Hi = 24 V Lo = 12 V |

TABLE 2-continued

Lower significant 16 bits of the PSSW

| Bit # | Bit Name | Description |
|---|---|---|
| 5 | BAT_Presence | Battery presence detection signal<br>Hi = detect and report missing battery or battery voltage too low<br>Lo = do not detect/report missing battery |
| 6 | OVER_TEMP | Over-temperature fault signal<br>Hi = Over-temperature occurred<br>Lo = No Over-temperature |
| 7 | FAL_LOVAC | AC fault signal to AC FLT relay and LED, reverse logic<br>Hi = AC input voltage is normal<br>Lo = AC FLT occurred |
| 8 | FLT_SYSTEM | System fault signal to SYS FLT relay and LED, reverse logic<br>Hi = AC System is normal<br>Lo = SYS FLT occurred |
| 9 | FAI_OPTION | User setting whether to latch FAI state once triggered<br>Hi = latch FAI state (user jumper connected)<br>Lo = do not latch FAI state |
| 10 | FAI_SIG | FAI signal sensed by MCU<br>Hi = FAI activated<br>Lo = No FAI signal |
| 11 | FAI_OUT | Enable FAI LED (red)<br>Hi = FAI LED turned on, FAI relay energized.<br>Lo = FAI LED turned off, FAI relay not energized. |
| 12 | X | Reserved for future use |
| 13 | X | Reserved for future use |
| 14 | X | Reserved for future use |
| 15 | X | Reserved for future use |

In addition to the above described information, the NAC power control board 315 also stores critical parameters that may be accessed using the CAI apparatus 403. The NAC power control board 315 includes NAC logic which may be, for example, a microcontroller and a memory, in accordance with one embodiment. The parameters stored by the NAC power control board 315 are listed in Table 3 below.

TABLE 3

NAC power control board parameters

| Variable Name | Value Range | Notes |
|---|---|---|
| Device ID | NAC1, NAC2, NAC3, . . . , NAC9 | One model, multiple boards |
| Fault condition | TRUE, FALSE | TRUE = fault, FALSE = not fault |
| FAI activation | TRUE, FALSE | TRUE = Alarm, FALSE = no alarm |
| NAC operation mode | Supervisory, Alarm | Supervisory = in supervisory mode; Alarm = in alarm mode |

In accordance with the embodiments, all the above illustrated parameters from the power management system 400, that is, all parameters from the main power supply/charger board 301 as well as from the NAC power control board 315, can be accessed using either the local PC 325 via a serial data link as access interface 327, or remote device 319 via network 313 which may include intranet/Internet 369.

Figure 4B:
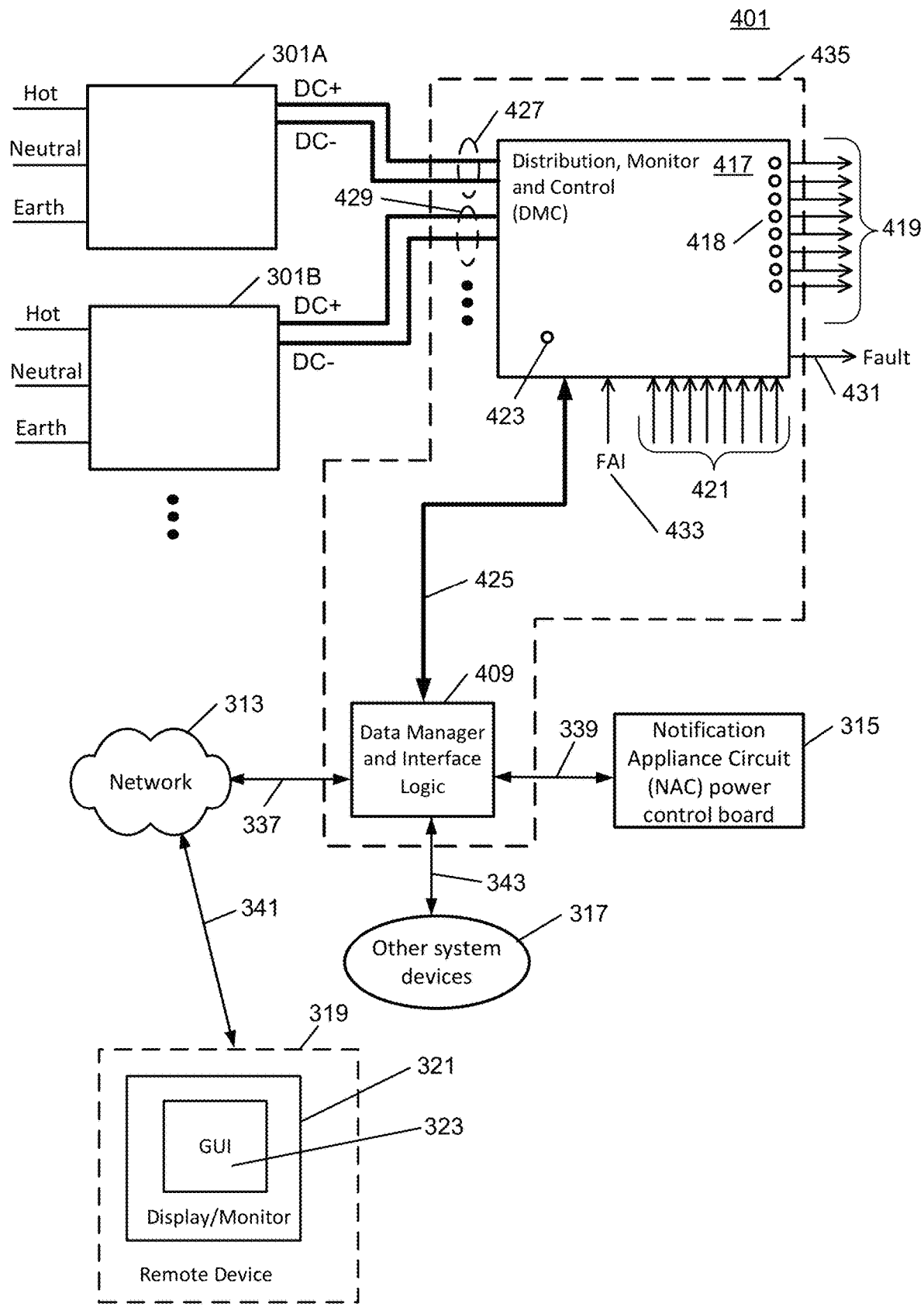
FIG. 4B is a diagram of a power management system with networked, channelized power distribution control in accordance with one embodiment.

FIG. 4B is a diagram of a power management system 401 with networked, channelized power distribution control in accordance with one embodiment. The power management system 401 includes a networked, channelized power distribution control (CPDC) 435 apparatus in accordance with the embodiments. The CPDC 435 apparatus includes the data manager and interface logic 409 and a distribution monitor and control (DMC) 417 operatively coupled by an interface 425. The interface 425 may be a Serial Peripheral Interface (SPI), an Inter Integrated circuit (I²C), Universal Asynchronous Receiver Transmit (UART), or some other appropriate interface, etc. The data manager and interface logic 409 enables the DMC 417 to communicate with the remote device 319 over the network 313 by using the interface 425. The GUI 323 allows entry of operation parameters for the DMC 417 such as, but not limited to, control input type, load device type, how to respond to the FAI signal and how to respond to AC power loss. The GUI 323 also allows a user to enter lower and upper limits for voltage and current of various channelized control outputs.

The DMC 417 may receive power from various power supply/charger boards such as, for example, power supply/charger board 301A and power supply/charger board 301B. Each of the power supply/charger boards 301A and 301B have a corresponding battery backup as described in the example embodiments of FIG. 3 and FIG. 4A. The DMC 417 receives a DC input voltage from the power supply/charger board 301A via voltage inputs 427, and similarly receives a DC input voltage from the power supply/charger board 301B via voltage inputs 429. The DMC 417 is operative to receive a number of control inputs 421 and, in one embodiment, may receive eight control inputs. The control inputs 421 are provided by one or more access control boards that may correspond to various security system components such as, but not limited to, card readers or other types of sensors etc. The control inputs 421 may be provided by normally closed (NC) or normally open (NO) relay contacts in some embodiments. In other embodiments, open collector (OC) or direct voltage input (V) may be used as the control inputs 421. In yet other embodiments the control inputs 421 may be various combinations of NC, NO, OC, or V control inputs. Correspondingly, the DMC 417 provides control outputs 419. Each one of the control inputs 421 has a corresponding control output 419 and has a corresponding power distribution channel within the DMC 417. In some embodiments, the DMC 417 will also have a set of power distribution channel status LEDs 418 that provides visual status indication for each corresponding power distribution channel within the DMC 417.

The DMC 417 also receives an FAI input 433 and provides a fault signal output 431 which may be provided to an annunciator or to other equipment within the location of the DMC 417. The DMC 417 may also include a DMC fault LED 423 to provide a visual indication of problems occurring within the DMC 417 internal circuitry. Further details of the DMC 417 are provided in FIG. 4C, which illustrates an example power distribution channel.

Figure 4C:
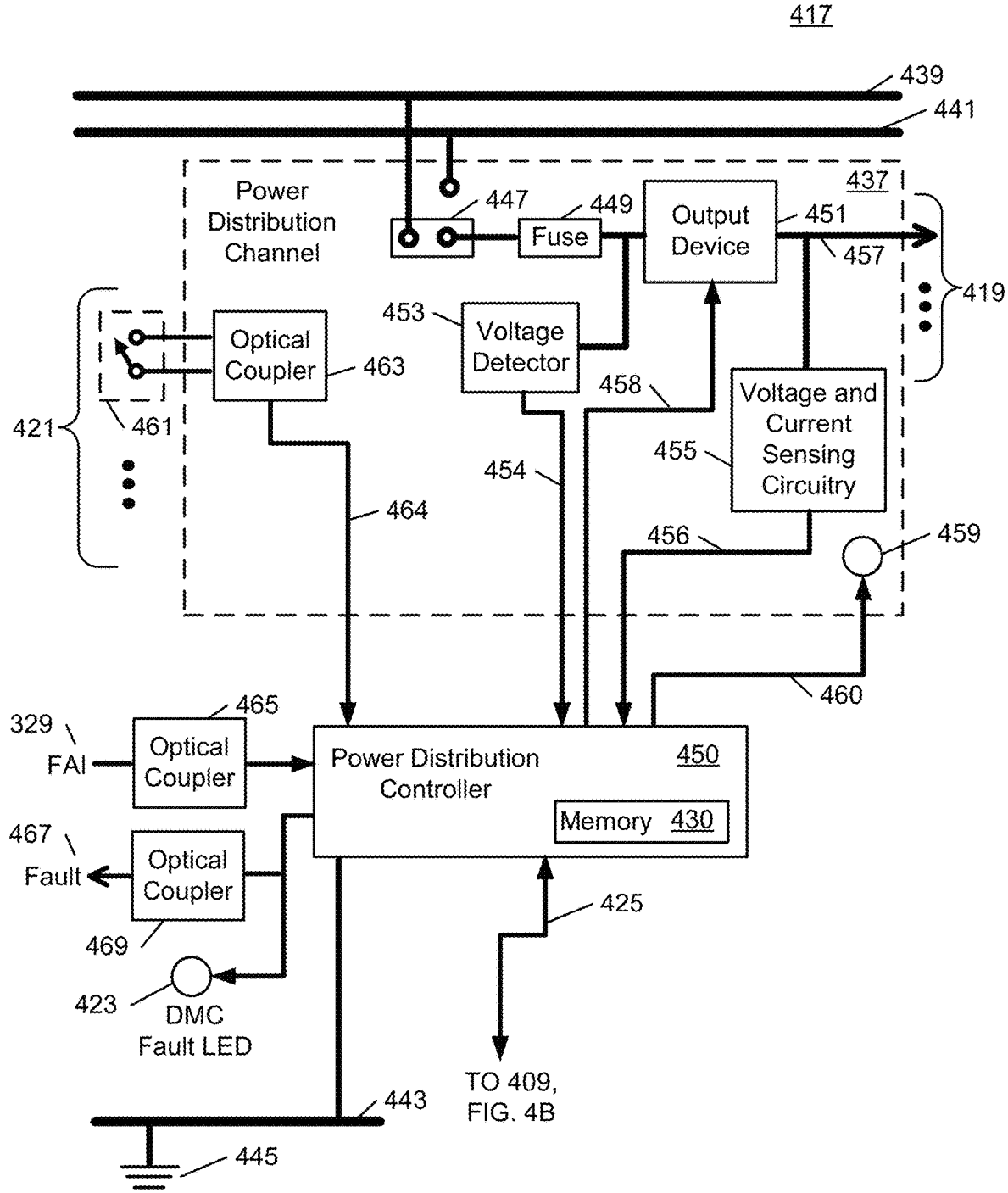
FIG. 4C is a diagram providing details of one channel related to the power management system with channelized power distribution control illustrated in FIG. 4B.

FIG. 4C is a partial block diagram showing some internal components of the DMC 417. More particularly, FIG. 4C illustrates an example power distribution channel 437 in accordance with one embodiment. The DMC 417 as illustrated in FIG. 4B may have several power distribution channels such as eight power distribution channels as illustrated in the FIG. 4B example. The DMC 417 may have one or more power distribution buses such as power distribution bus 439 and power distribution bus 441. Each power distribution channel, such as power distribution channel 437, may be connected to one of the power distribution buses via a selectable jumper 447. The example power distribution channel 437 is shown connected to power distribution bus 439 using the selectable jumper 447 as shown. The two power distribution buses may provide different voltages to the DMC 417 such as, but not limited to 24 V DC or 12 V DC. The selectable jumper 447 is connected to a fuse 449 and then to an output device 451 which provides the channel control output 457. The fuse 449 limits the upper power level from the power distribution bus 439, or any other connected power distribution bus, to a safe level for the corresponding power distribution channel 437. In some embodiments, a positive temperature coefficient (PTC) device may be used in lieu of the fuse 449 to provide the protection and isolation function. The channel control output 457 is one of the control outputs 419 which was also shown in FIG. 4B. The output device 451 may be an electromechanical relay, or may be a power transistor circuit or some other circuit that provides suitable voltage output to drive a corresponding security system device connected to the control output 457.

A voltage detector 453 is operatively connected to the voltage connection between the fuse 449 and the output device 451. The voltage detector 453 monitors the input voltage to the output device 451 and provides a voltage detection signal to the power distribution controller 450 by connection 454. If the voltage detector 453 does not sense voltage input to the output device 451 due to the fuse 449 being blown, or due to the selectable jumper 447 being disconnected or missing, the voltage detector 453 provides a logic "LOW" signal to the power distribution controller 450 over the connection 454. Otherwise voltage detector 453 will provide a logic "HIGH" signal to the power distribution controller 450. It is to be understood that the terms logic HIGH and logic LOW refer to the voltage levels that correspond to a logical one or a logical zero respectively, and may be any appropriate voltage level required by the power distribution controller 450. For example logic HIGH or logic one may correspond to a positive 5 V DC and logic LOW or logic zero may correspond to ground voltage or to a negative 5 V DC or vice versa or to some other appropriate voltage levels.

Voltage and current sensing circuitry 455 is operatively connected to the control output 457 and provides voltage and current measurement data by connection 456 to the power distribution controller 450. The power distribution controller 450 also drives the power distribution channel status LED 459 via connection 460. A control input 461, which is one of the control inputs 421 illustrated in FIG. 4B, and which may be any one of the various types of control inputs discussed above, is provided to an optical coupler 463 which provides the operative input signal to the power distribution controller 450 over connection 464. The power distribution controller 450 will receive the input state of the control input 461 over the connection 464 as either an open or closed input state. Each power distribution channel within the DMC 417 is configured similarly to the example power distribution channel 437 shown in FIG. 4C. The power distribution controller 450 may be a processor such as, but not limited to an MCU, and includes a non-transitory, non-volatile memory 430 that may store settings related to the output device 451 and may store data collected from the voltage detector 453 and the voltage and current sensing circuitry 455.

The power distribution controller 450 also receives the FAI signal 329 through an optical coupler 465 and provides a fault output signal 467 through the optical coupler 469. The fault output signal may also be used to drive the DMC fault LED 423 which is also shown in FIG. 4B. The DMC 417 also has an internal return bus 443 which is connected to ground 445, and which is operatively connected to the power distribution controller 450. The power distribution controller 450 may send and receive data and control signals over the interface 425 to the data manager and interface logic 409 as shown in FIG. 4B.

Therefore the DMC 417 measures the output voltage and current of each power distribution channel. The measured voltage and current values are compared to their respective upper and lower limits stored in memory 430, which may be set by users using the remote device 319. If the power distribution controller 450 detects that any of the parameters are out of limit, then the on-board power distribution channel status LED 459 will display a warning signal. Additionally, the power distribution controller 450 will send a warning signal over the interface 425 to the data manager and interface logic 409 and subsequently therefore to the remote device 319. The graphical user interface 323 will display the fault status and, if appropriate settings are selected, may e-mail notification of the fault status to the appropriate maintenance personnel.

The remote monitoring and control capabilities of the voltage and current for the individual power distribution channels as described above provides, among other advantages, early warning for potential failure of the connected devices, and also allows reset of individual devices without affecting other devices receiving power from the same power supply/charger. In other words, the device connected to the control output 457 using the power distribution channel 437 may be individually reset by the power distribution controller 450 by disabling a control voltage over the connection 458 which does not disturb any of the other output devices that are on different power distribution channels within the DMC 417.

In one example, and access control board may provide one of the control inputs 421 to switch power on and off to various security devices such as network switches, door locks, card readers, surveillance cameras and video recorders in a security surveillance system. Door locks may be controlled by magnetic locks, electrical strikes, or etc. Such example security devices may be divided into two categories: those that require power on/off control to operate, and those that require constant power to operate. For devices that require power on/off control to operate, the DMC 417 receives the control inputs 421 from the controlling devices such as the access control boards in an access control system. The DMC 417 accesses the non-transitory, non-volatile memory 430 to determine the programmed control input states, the input type and the output load type, along with the FAI signal 329 state and the AC power state to determine whether to turn on or turn off the output voltage for each power distribution channel. When such security devices are connected to a single power supply/charger, in prior systems, resetting a device would require removing power to all other devices receiving voltage from that particular power supply/charger. As would be understood, the time interval of the reset may create security issues by temporarily disabling any of the example devices described above. The CPDC 435 apparatus which includes the DMC 417 therefore provides the advantage of avoiding security issues by allowing isolation of a single security device for reset and troubleshooting purposes. Another advantage is that potential failure of a specific device can be detected in advance of failure based on the expected upper and lower limits of voltage and current for that device which are monitored by the power distribution controller 450.

Yet another advantage of the herein disclosed embodiments is that parameters and settings for the various output devices, such as output device 451, may be set remotely and monitored remotely in real time using the remote device 319 and the GUI 323. Some of the above-described advantages are described in further detail with respect to examples of the GUI 323 provided herein below and with respect to FIG. 21, FIG. 22, FIG. 23, FIG. 24 and FIG. 25. Another advantage of the power distribution controller 450 is that even if the data manager and interface logic 409 is disconnected, or if the power is cycled, the power distribution controller 450 may access user entered system information in the non-transitory, non-volatile memory 430 and will control the output devices, such as output device 451, to turn on or turn off the corresponding power distribution channels according to the input state of the corresponding control input, such as control input 461, and the user entered system information.

Some examples of fault detection, indication and warning provided by the power distribution controller 450 will now be described. One example fault condition occurs if there is a blown fuse 449 or disconnected or missing selectable jumper 447. For either or both of these example conditions, there is no output voltage at the output terminal of the corresponding channel, i.e. at control output 457. The power distribution channel status LED 459 will be off In this case the GUI 323 may display a DMC 417 data page on the remote device 319. The DMC 417 data page will display "No" in a "Power Ready" column corresponding to the control output 457. The DMC Fault LED 423 will be lit by the power distribution controller 450. If the user made appropriate settings to send an email alert, the email alert will be sent to the designated recipients. A fault output signal 467 will also be sent out from the power distribution controller 450 to other devices in the system via the optical coupler 469.

A second example fault condition may occur if output voltage or current measured by the voltage detector 453, or by voltage and current sensing circuitry 455, exceeds pre-programmed limits. For this condition, the power distribution controller 450 will drive the power distribution channel status LED 459 to flash at about, for example, a 4 Hz rate. The DMC Fault LED 423 will also be lit by the power distribution controller 450. The DMC 417 data page of GUI 323 on the remote device 319 will display "Fault" under an "Output Status" column. The text "Fault" may also be shown in yellow color to indicating warning. The DMC Fault LED 423 will be lit by the power distribution controller 450. If the user made appropriate settings to send an email alert, the email alert will be sent to the designated recipients. A fault output signal 467 will also be sent out from the power distribution controller 450 to other devices in the system via the optical coupler 469.

Figure 5:
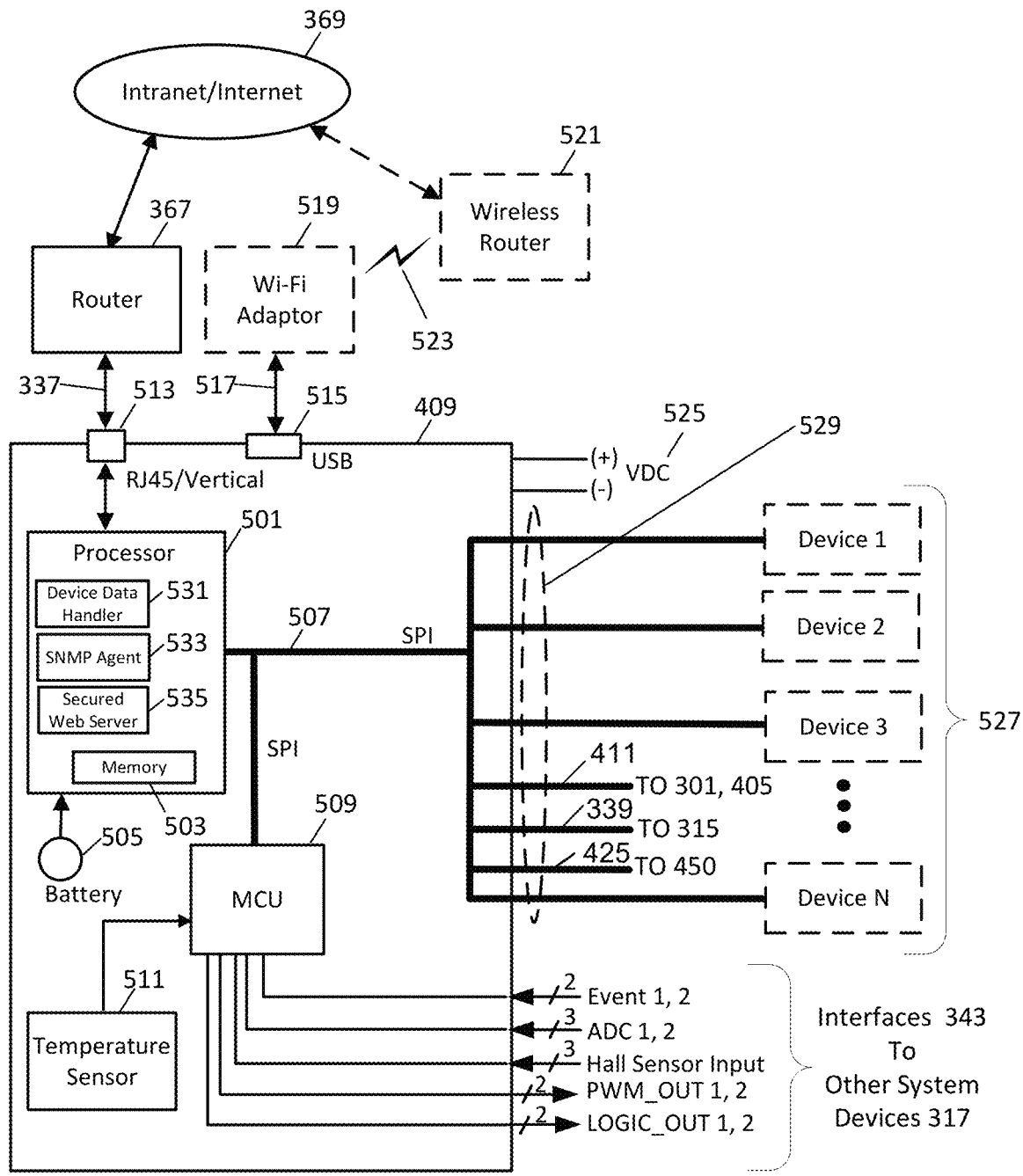
FIG. 5 is a diagram providing details of the data manager and interface logic shown in FIG. 4A and FIG. 4B, in accordance with an embodiment.

Turning to FIG. 5, further details of the data manager and interface logic 409 are provided. As was discussed above, in the exemplary embodiment illustrated in FIG. 4A and FIG. 5, the data manager and interface logic 409 may provide an Ethernet interface for network connectivity in some embodiments. However, other suitable interfaces for network connectivity may be provided in other embodiments. The data manager and interface logic 409 may include a processor 501, which in some embodiments may be an ARM processor, and which may include integrated memory 503. The memory 503 may be a flash memory and may also be external from the processor 501 in some embodiments. The processor 501 executes instructions and runs an operating system such as, for example, Linux or Windows CE™. The processor 501 is operative to perform the tasks of network (such as, but not limited to, Ethernet) communication protocol, device data collection and parameter setting via an interface such as, but not limited to, Serial Peripheral Interface (SPI) bus 507 connection, data presentation through web pages, email alert arbitration and execution, and Simple Network Management Protocol (SNMP) network management software. The processor 501 is equipped with a real time clock which is maintained by a battery 505 in the event that the processor 501 loses power from the voltage inputs 525.

The data manager and interface logic 409 may also include an RJ45 connector 513 to enable connection to the Internet or intranet 369 via router 367 over the interface 337 using, for example, an ANSI Category 5 cable. The data manager and interface logic 409 may also include a USB port 515 to enable connection to, for example, a Wi-Fi adaptor 519 using a USB cable 517. That is, in some embodiments, the data manager and interface logic 409 may communicate with the Internet/intranet 369 via a wireless link 523 between a USB connected Wi-Fi adaptor 519 and a wireless router 521 as illustrated in FIG. 5.

The data manager and interface logic 409 includes an internal SPI bus 507 such that the processor 501 is operatively coupled to an MCU 509 and also to a plurality of external, digitally accessible devices 527 via a plurality of external SPI ports 529. The external, digitally accessible devices 527 that are operatively coupled to the data manager and interface logic 409 include the main power supply/charger board 301, which is operatively coupled via interface 411, as well as the NAC power control board 315 which is operatively coupled via interface 339 as is also illustrated in FIG. 4A. The power distribution controller 450 of DMC 417 is operatively coupled via interface 425 as is also illustrated in FIG. 4B and FIG. 4C. The plurality of external, digitally accessible devices 527 may consist of the power supply boards (which may include several different model numbers at different power ratings), the NAC power control board 315, and/or one or more DMCs such as DMC 417. The devices 527 may be installed and physically located inside a same cabinet housing the data manager and interface logic 409 or may be located remotely. In the exemplary embodiment illustrated in FIG. 4A, only one power supply board and one NAC power control board 315 are used. The main power supply/charger board 301 of the embodiments is digitally accessible due to control and access logic 405 which collects and provides access to critical parameters via the SPI interface 411 as was discussed previously above.

The processor 501 is operative to read critical parameters of the plurality of devices 527 over the SPI bus 507 and provide the parameters to a remote device 319. The parameters may be sent to the remote device 319 over a network, for example intranet/Internet 369. Some of the device operating parameters can also be set using the GUI 323 which is displayed on the remote device 319. In other words, the data manager and interface logic 409 is operative to receive parameter settings, values, etc., from the GUI 323 of the remote device 319, and, in response, update corresponding device parameter settings, values, etc. Examples of the parameters for the power supply/charger boards that can be controlled via the remote device 319 include "Set battery charge current," "Set report delay time for AC fault," "Set report delay time for System fault," "Reset battery "hours of service" counter," "Reset AC fault counter," "Reset System fault counter," "Turn on/off the AC-DC converter output (testing battery operation mode)," and "Forcing on/off the FAI_OUT state" (for DC2 output reset).

The MCU 509 also collects data that are not sensed by the plurality of digitally accessible devices 527, such as voltage, current and logic signals from other system devices 317. The MCU 509 can measure any DC voltage outputs via an on board analog-to-digital converter (ADC) and can measure any current via Hall sensor inputs. The MCU 509 can also sense external events such as, for example, an external device failure condition. An external event example is to sense the tamper switch state on the equipment housing cabinet door. If the cabinet door is tampered with, the tamper switch state will be sensed by the MCU 509 and an event input will be activated. In accordance with the embodiments, the event input may be pre-programmed as one of various email alert trigger conditions, and an email alert will be sent out to a system operator to report the incident.

The measured data from other system devices 317 are sent from the MCU 509 to the processor 501 via the internal SPI bus 507. The MCU 509 interfaces 343 include Pulse Width Modulated (PWM) and open collector/drain logic outputs that can be used to remotely activate/deactivate certain outputs. An example application of the logic output is to remotely reset the power to a surveillance camera when it gets hung up. The embodiments may also include a temperature sensor 511, which may be a temperature sensor integrated circuit (IC), that senses the housing cabinet internal temperature. The temperature data is read by the MCU 509 and sent to the processor 501 via the SPI bus 507. All the data collected by the processor 501 are time stamped and saved in memory 503, which, as discussed above, may be a flash memory.

The data manager and interface logic 409 interfaces 343 enable the MCU 509 to sense parameters including Event1, Event2 (isolated logic inputs); ADC1, ADC2, and ADC3 (0-30V range); and Hall current sensor 1, 2 and 3 (current is converted to 0-5V signal). The data manager and interface logic 409 interfaces 343 also include output control signals PWM1, PWM2, Logic_OUT1 and Logic_OUT2 (open collector, or open drain).

In accordance with the embodiment exemplified in FIG. 4A and FIG. 5, the data manager and interface logic 409 may be implemented using two processors, processor 501 and MCU 509. Further in accordance with the embodiment exemplified in FIG. 4A and FIG. 5, processor 501 may execute instructions related to various software and/or firmware modules including a secured web server 535 with an Ethernet driver; an SNMP agent 533 and a device data handler 531.

The SNMP agent 533 exposes the parameters of all connected devices to the SNMP manager at the remote location, for example, an SNMP manager on the remote device 319. The parameters are organized in a hierarchical manner by Management Information Bases (MIBs) per established standard Abstract Syntax Notation One (ASN.1).

Figure 6:
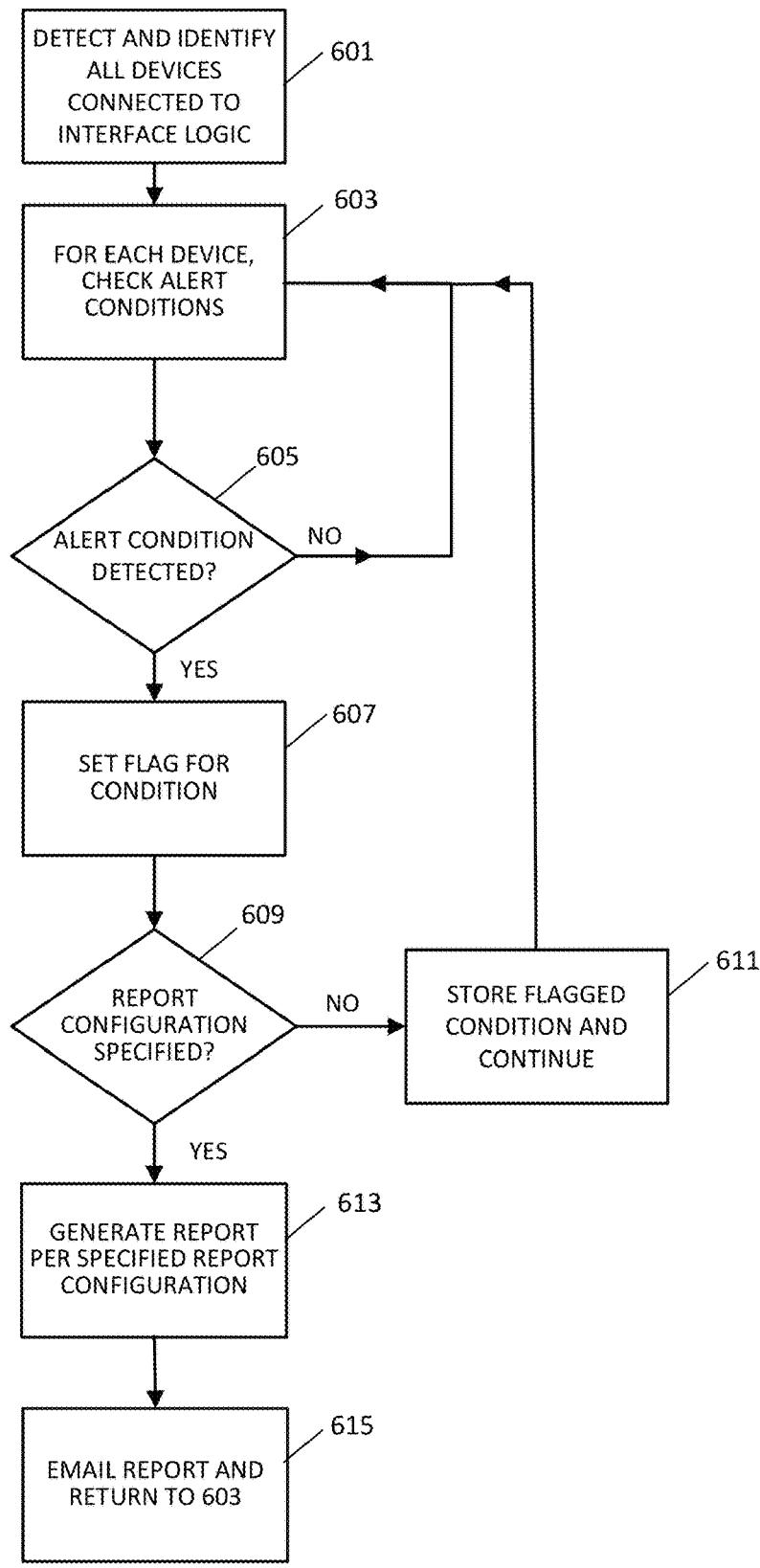
FIG. 6 is a flowchart describing high level operation of the data manager and interface logic shown in FIG. 4A, FIG. 4B and FIG. 5 in accordance with the embodiments.

FIG. 6 provides a flowchart 600 of a high level operation of the Device Data Handler module 531. As shown in FIG. 6 block 601, the Device Data Handler module 531 detects and identifies all the devices connected to the data manager and interface logic 409. In 603, for each connected device, the Device Data Handler module 531 checks the alert conditions setup by, for example, a system administrator, and sets a flag in 607 if the conditions are met in 605. The Device Data Handler module 531 generates a report in 613 according to the report configuration setup by the administrator and checked in 609. The Device Data Handler module 531 may then send an email of the report in 615 and then continue to monitor as in 603. If no report configuration is specified in 609, then in 611 the Device Data Handler 531 will store the flagged condition and continue as in 603.

In some embodiments, the Device Data Handler module 531 may read device data every 2 seconds for real time data updates and save a record every hour. For example, a total of 512 data instances, that is, data record files, may be saved in 512 data files. The first file is always the latest data at an approximately 2 second update period. The second file is the nearest hourly record. The third file is the second nearest hourly record, and so on. These data record files can be viewed from the secured web server 535 device parameter page and is discussed in further detail below.

Figure 7:
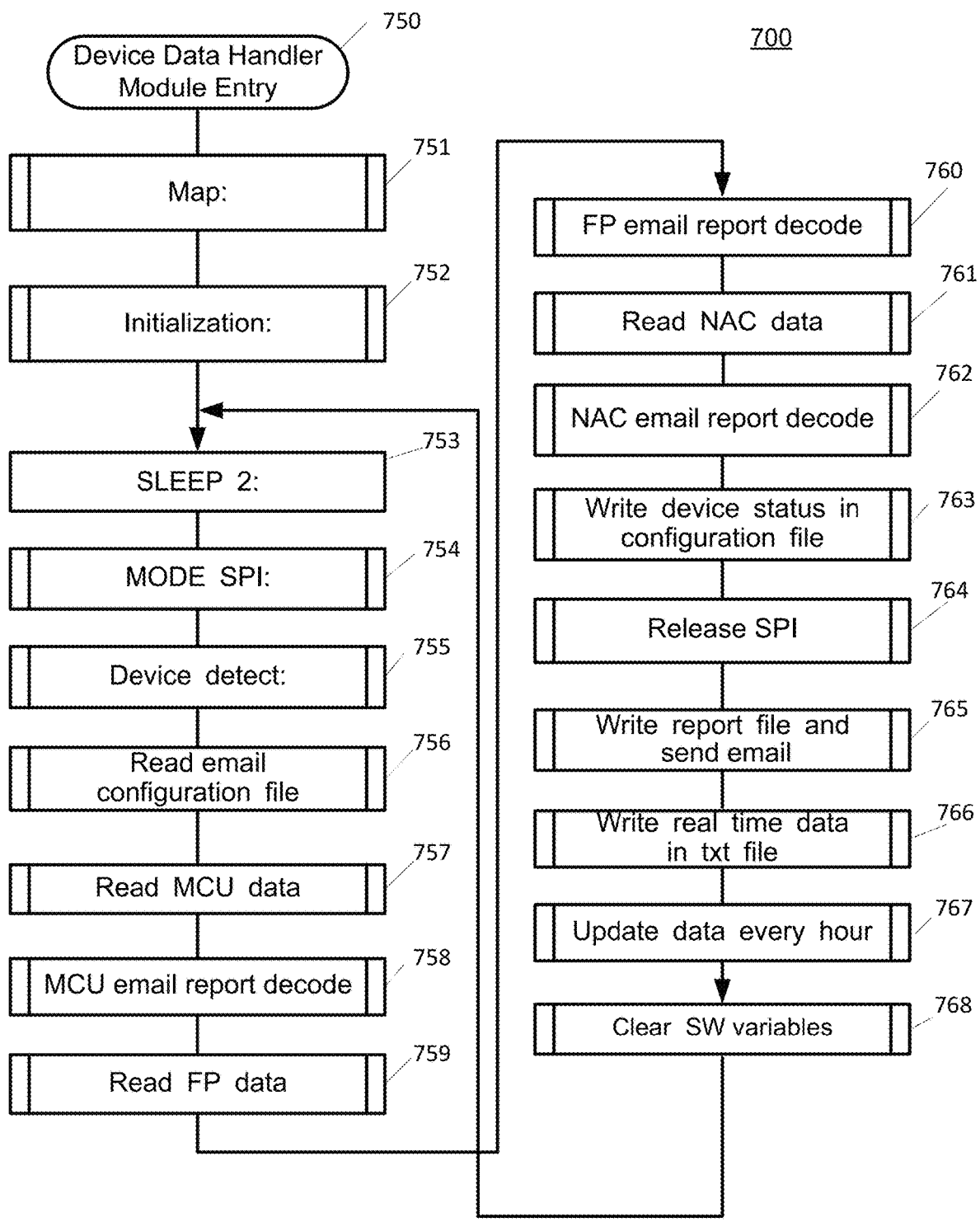
FIG. 7 is a flowchart providing further details of operation of the data manager and interface logic in accordance with the embodiments.

FIG. 7 is a flowchart 700 and provides further details of operation of the Device Data Handler module 531 executing on the processor 501. The Device Data Handler module 531 entry point is shown in 750. In 751, the processor 501 loads the memory management unit for Universal Serial Interface (USI) control. In 752, processor 501 initializes the I/O pins and variable default values. The Device Data Handler module 531 enters a wait state "SLEEP 2" as shown in 753. In 754, the processor 501 is set to "MODE SPI," that is, it sets USI to SPI operation and sets the SPI to be compatible with Device mode. In 755, the Device Data Handler module 531 scans and identifies all devices that are connected to the data manager and interface logic 409, and updates the device table. In 756, the Device Data Handler module 531 reads the specified email alert conditions and email report settings.

In 757, the Device Data Handler module 531 reads the MCU 509 data, which may include, as was discussed above, data from other system devices 317. In 758, the Device Data Handler module 531 checks the MCU 509 data against the specified email alert conditions. If an email alert condition is met, or a condition is recovered, an email request flag will be set by the Device Data Handler module 531. In 759, the Device Data Handler module 531 reads the FP type device data, i.e., the data obtained from the main power supply/charger board 301. As was described in detail above, the main power supply/charger board 301 is digitally accessible because it includes, for example, the control and access logic 405, in accordance with the exemplary embodiment shown in FIG. 4A. In 760, the Device Data Handler module 531 checks the FP device data against specified email alert conditions. If alert condition is met, or a condition is recovered, an email request flag will be set by the Device Data Handler module 531. In 761, the Device Data Handler module 531 reads the NAC type device data, for example, the data obtained from the NAC power control board 315. In 762, the Device Data Handler module 531 checks the NAC device data against the specified alert conditions. If an alert condition is met, or a condition is recovered, an email request flag will be set by the Device Data Handler module 531.

In 763, the Device Data Handler module 531 writes the device status to the configuration files for web display. In 764 the processor 501, under Device Data Handler module 531 instruction, releases the SPI mode and switches to default mode, and in 765 the Device Data Handler module 531 writes the report file according to specified email report settings and sends email to an email recipient list (which, for example, may be setup by an administrator). In 766, the Device Data Handler module 531 saves the current device data in text files for web page display. In 767, the Device Data Handler module 531 manages the hourly update of data files for web page display. In 768, the processor 501, under Device Data Handler module 531 instruction, clears software variables to free up memory and the Device Data Handler module 531 will then loop back to 753 "SLEEP 2" as shown in FIG. 7.

Therefore, as described above the data manager and interface logic 409 provides, among other advantages, the capability to collect and manage power management system 400 data from a variety of sources including digitally accessible and non-digitally accessible device types. Further, the data manager and interface logic 409 provides the advantage of enabling remote access of parameters and/or settings over a network by a remote device such as remote device 319. System operators may thereby realize reduced costs in that maintenance personnel need not always visit the location to perform certain tasks or obtain needed data. Another advantage provided by the data manager and interface logic 409 is settable email alerts and report formats as will be described in further detail below.

Figure 8:
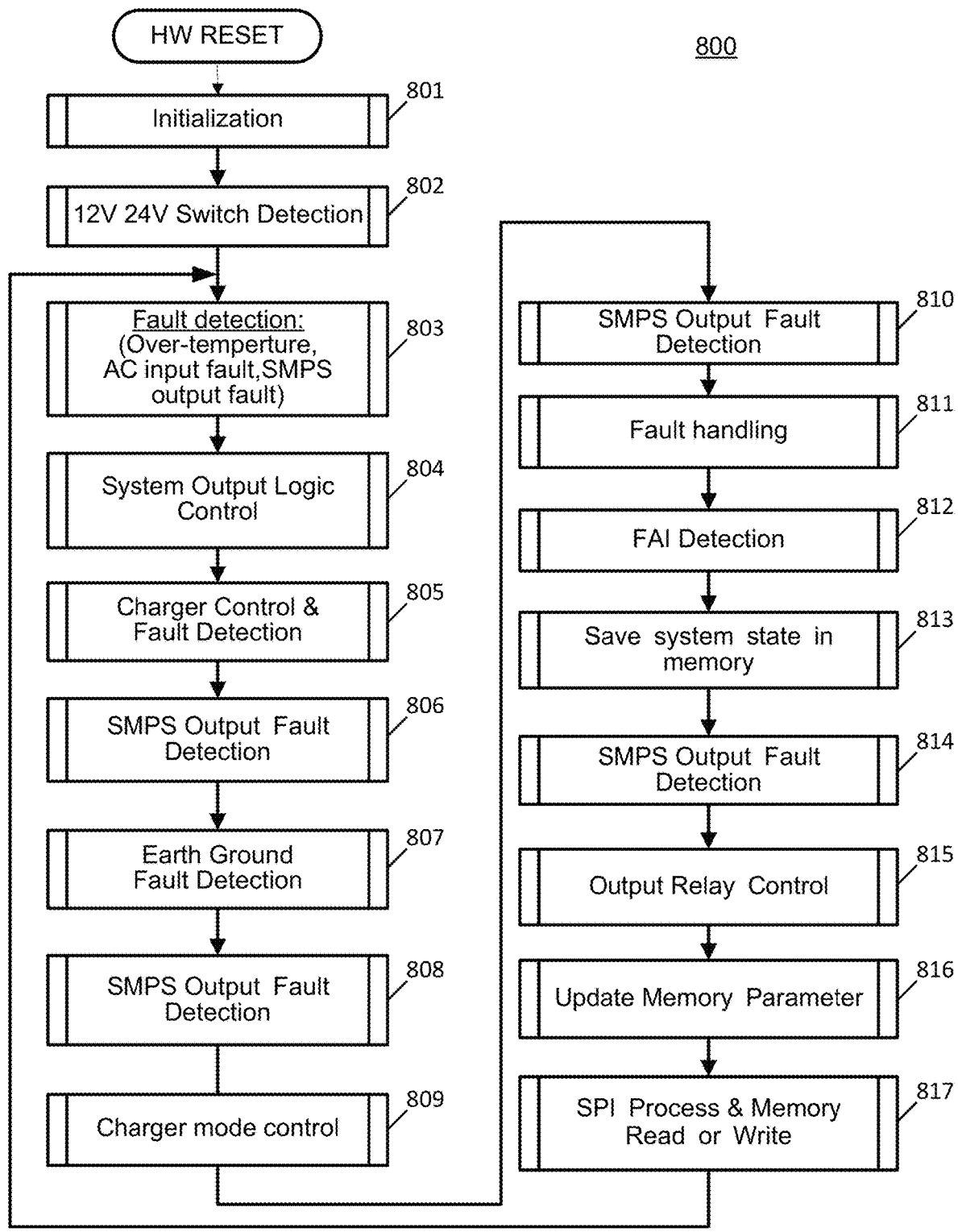
FIG. 8 is a flowchart describing high level operation of the control and access logic in accordance with the embodiments.

As discussed above, the embodiments provide a digitally accessible power supply such as the main power supply/charger board 301, and this is achieved by including the control and access logic 405. FIG. 8 provides a flowchart 800 illustrating operation of the control and access logic 405 in accordance with the embodiments. In 801, the control and access logic 405 performs initialization which includes setting the initial states of all the peripherals and initial values of all variables. In 802, the control and access logic 405 detects the voltage setting switch, which is an on-board switch, and may determine whether a given voltage is selected, for example, 12V or 24V. The control and access logic 405 is operative to read the switch setting and load the proper parameter set according to the selected voltage. In 803, the control and access logic 405 checks various fault conditions, including, for example, "over-temperature," "AC input voltage too low," and "Switch Mode Power Supply (SMPS) output voltage out of range." In 804, the control and access logic 405 performs system logic control such as, for example, switching to battery power, switching LEDs on or off, switching relays on or off, etc. In 805, the control and access logic 405 performs charger 349 control and fault detection. The charger 349 current is programmable using either the PC 325 or by the remote device 319 over the network 313. The charger 349 may have a default value set as the highest available charge current. The data communication between the charger 349 and the control and access logic 405 is over an interface 413 which may be, for example, a digital-to-analog converter, a filtered PWM signal, an analog-to-digital converter, GPIO pin, SPI or any other suitable interface. The control and access logic 405 is operative to read a programmed charge current command from the memory 407.

In 806, the control and access logic 405 performs SMPS output fault detection and may detect faults such as, for example, "voltage out of upper limit," "voltage out of lower limit," or a short circuit condition. In 807, the control and access logic 405 performs earth ground fault detection. That is, if the output positive or negative terminal is shorted to earth ground, a fault condition will be detected by the control and access logic 405.

As shown in 808, another SMPS fault detection occurs. The SMPS fault detection function is executed several times in a control cycle in order to increase the sampling rate so the system can respond to a severe fault (such as a short circuit) quickly before any component damage occurs. As shown in 809, the control and access logic 405 may implement charger 349 mode control. The charger 349 may operate in two modes; a normal charge mode when the battery capacity is below 90%, and a trickle charge mode when the battery is charged to above 90% capacity. In trickle charge mode, the battery 335 voltage is monitored to make sure that it will not exceed manufacturer specified maximum voltage which may result in damage. A third SMPS fault detection operation occurs as shown in 810 for the reasons discussed above.

In 811, the control and access logic 405 performs fault handling. For fault reporting purpose, all faults are divided into two groups; AC fault and all the other faults which are grouped as System faults. The fault handler operation of the control and access logic 405 keeps track of the length of time for each fault and compares the fault time with the fault report delay time which is programmable. Once the fault time has reached the report delay time, a fault status will be asserted by the control and access logic 405. That is, among other things, corresponding local fault reporting means will be activated. The local fault reporting may include turning on certain on-board LEDs, de-energizing the corresponding fault relay and setting a corresponding fault bit so that the local PC 325 or remote device 319 can read the data and fault report. The number of AC faults and the number of System faults are recorded and saved in memory 407.

In 812, the control and access logic 405 performs an FAI signal 329 detection operation. If a voltage is received from the on-board FAI input terminals, that is, over the FAI interface 331, the control and access logic 405 will execute the FAI response. The FAI response may include, among other things, setting an FAI bit so that PC 325 or remote device 319 can read and report the FAI condition, lighting up a red LED of the LEDs 351 located on the main power supply/charger board 301, turning the DC2 output on (if DC2 is set to "fail secure"), or off (if DC2 is set to "fail safe"). A user can set the DC2 to "fail secure" or "fail safe" mode by selecting an on-board jumper located on the main power supply/charger board 301. Alternatively, this feature may be programmed via the remote device 319 or via the PC 325.

As shown in 813, the control and access logic 405 saves the system state in memory 407. A timer, such as for example, an on-chip timer in embodiments where the control and access logic 405 is implemented using a microcontroller, keeps track of time elapsed since power up and since the battery 335 is connected. The power up time and battery 335 connection time are cumulated and saved in memory 407. The battery 335 connection time can be reset by a user via the remote device 319 or via the PC 325. Among other advantages, this feature is useful when a service technician replaces the battery 335. The power up time is not resettable (like an odometer). An exemplary list of variables stored in memory 407 is provided in Table 1 and Table 2 which were discussed above. A fourth SMPS fault detection operation is performed by the control and access logic 405 as shown in 814.

The control and access logic 405 is also operative to perform output relay control as shown in 815. Output relay control entails turning the output relay, of relays and output sensing 347, on or off based on control logic and fault conditions. For example, at power up, the control and access logic 405 will check whether output short circuit or other faults exist. If there is no fault, the control and access logic 405 will turn on the output relay. When AC power is lost, control and access logic 405 will enable the battery 335 and turn the output relay to the battery side so that the battery 335 will supply the load. When the AC power is recovered, the output relay, of relays and output sensing 347, will be turned back to the power supply (isolated AC-DC converter 345) side again and transfer the load to the power supply output.

In 816, the control and access logic 405 updates the memory 407 parameters. In 817, the control and access logic 405 processes the SPI operation and performs a memory 407 read or write operation if commanded by the remote device 319 or by the PC 325. For example, a user, via the remote device 319 or via the PC 325, may send a request to read the parameters of the main power supply/charger board 301. In response, the control and access logic 405 will read the requested parameters from memory 407 and send them out via the SPI interface 411. In another example, a user, via the remote device 319 or via the PC 325, may send request to change some parameters, e.g. charge current. In response, the control and access logic 405 will write the new charge current command to the memory 407. The control and access logic 405 will loop back to operation 803 as shown in FIG. 8.

Therefore, among other advantages, the main power supply/charger board 301, in accordance with the embodiments herein disclosed, is a digitally accessible device. The main power supply/charger board 301 is digitally accessible because it includes control and access logic 405 in accordance with the embodiments.

The various embodiments disclosed herein also include a graphical user interface, GUI 323, which may be accessed and displayed on a remote device, such as remote device 319, in order to access the various features of the embodiments described above. The various features and capabilities of the GUI 323 will now be described in detail.

Figure 9:
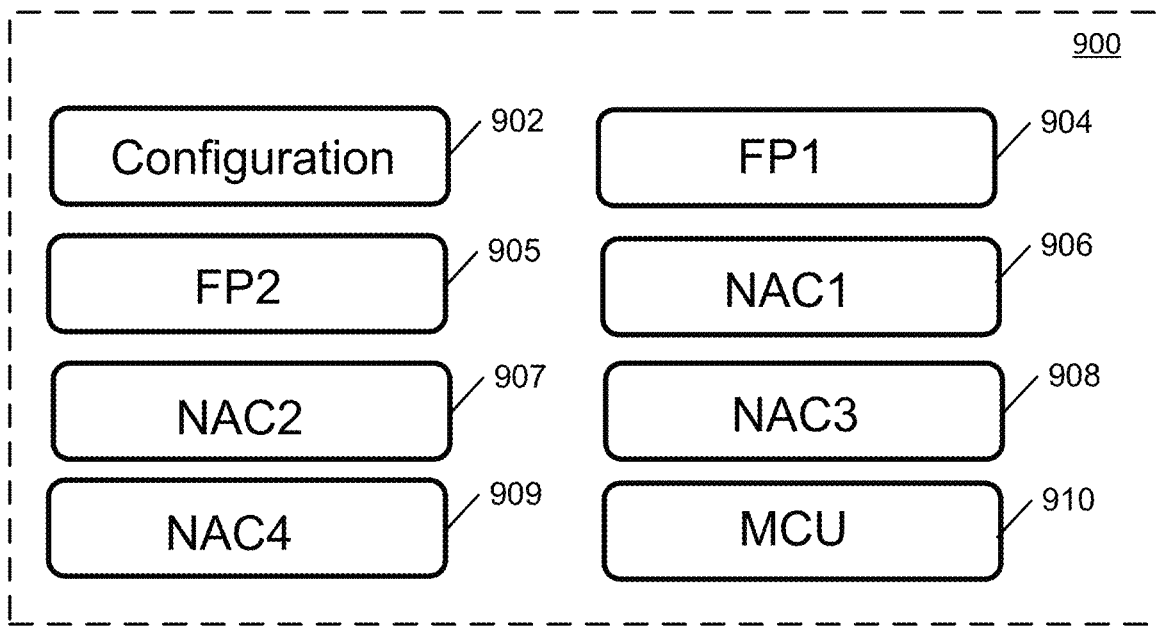
FIG. 9 is a diagram of a navigable initial page or Web page provided by a graphical user interface (GUI) feature in accordance with an embodiment.

FIG. 9 illustrates the top level contents of the secured web server 535, and an initial screen 900 of the GUI 323. The initial screen or "page" 900 provides a plurality of selectable buttons 902 through 910 as shown. Various selectable buttons and/or other selectable features of the GUI 323 may be selected in various ways in accordance with the embodiments, such as, but not limited to, mouse cursor point-and-click, touch screen, scrolling a cursor to the selectable item and hitting an "enter" key, using hot keys corresponding to the selectable feature, voice commands, etc., or any other suitable way of selecting a selectable feature using a remote device such as, for example, remote device 319. Button 902 "configuration" is used to setup, and edit system operating parameters. The remaining buttons 904 through 910 navigate to parameter pages for the various devices indicated on the button. For example, the initial screen 900 provides buttons for 2 FP devices, 4 NAC devices and an MCU. Any combination of device type/model may be connected in accordance with the embodiments. For example in one embodiment, a total of six devices may be connected.

In the exemplary embodiment of the GUI 323 that is provided by way of FIG. 9 through FIG. 20, the "FP1" button 904 navigates to the parameters page for "FP1," which may be, for example, the main power supply/charger board 301. Selecting the FP1 button 904 causes the GUI 323 to display the FP1 parameter page which provides access to the device data and allows programming of the parameters of the FP1 device. The other buttons of the screen 900 navigate similarly. For example, the FP2 button 905 navigates to the parameter page for the FP2 device which may be, for example, another power supply board that is installed in the power management system. Buttons 906, 907, 908 and 909 navigate to their corresponding one of four NAC power control boards connected to the system. Button 910 navigates to the parameter page for the MCU 509 of the data manager and interface logic 409.

Figure 10:
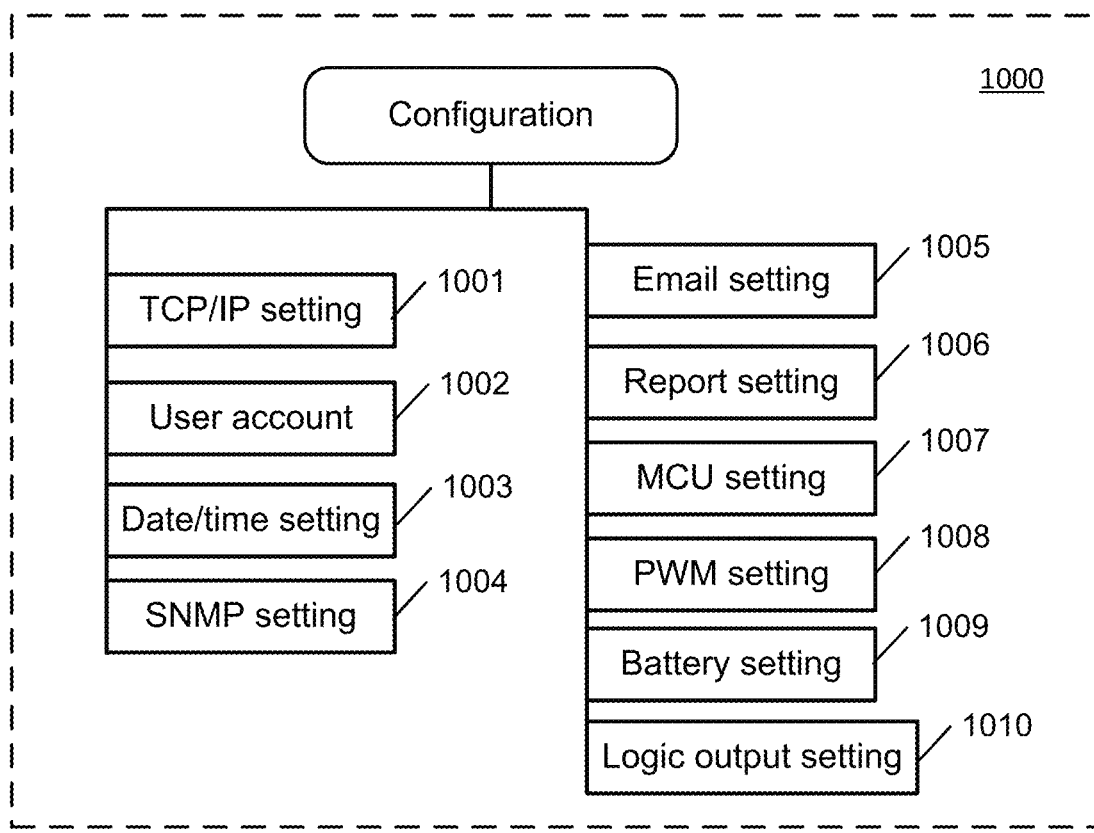
FIG. 10 is a diagram of a navigable configuration page of the GUI in accordance with an embodiment.

Selection of button 902 "configuration" navigates to the configuration page 1000 which is illustrated in FIG. 10. The configuration page 1000 provides another set of selectable buttons such as TCP/IP setting button 1001. Selection of TCP/IP setting button 1001 navigates to a TCP/IP settings page which allows entry of an IP address, subnet mask, gateway address, etc., so the power management system can be accessed by, for example, remote device 319 over intranet/Internet 369. This parameter may be set by a system administrator.

Button 1002 navigates to a user account setting page. The system administrator may use the user account setting page to setup user accounts for remote users having "read only" operation access. Only a system administrator can perform write operations in accordance with the exemplary embodiment. Button 1003 navigates to a date/time setting page that allows the system administrator to set the system date and time. The system administrator may select SNMP setting button 1004 to access an SNMP setting page to setup SNMP parameters, such as SNMP user account, password and trap address, etc.

Button 1002 navigates to a user account setting page. The system administrator may use the user account setting page to setup user accounts for remote users having "read only" operation access. Only a system administrator can perform write operations in accordance with the exemplary embodiment. Button 1003 navigates to a date/time setting page that allows the system administrator to set the system date and time. The system administrator may select SNMP setting button 1004 to access an SNMP setting page to setup SNMP parameters, such as SNMP user account, password and trap address, etc.

Figure 11:
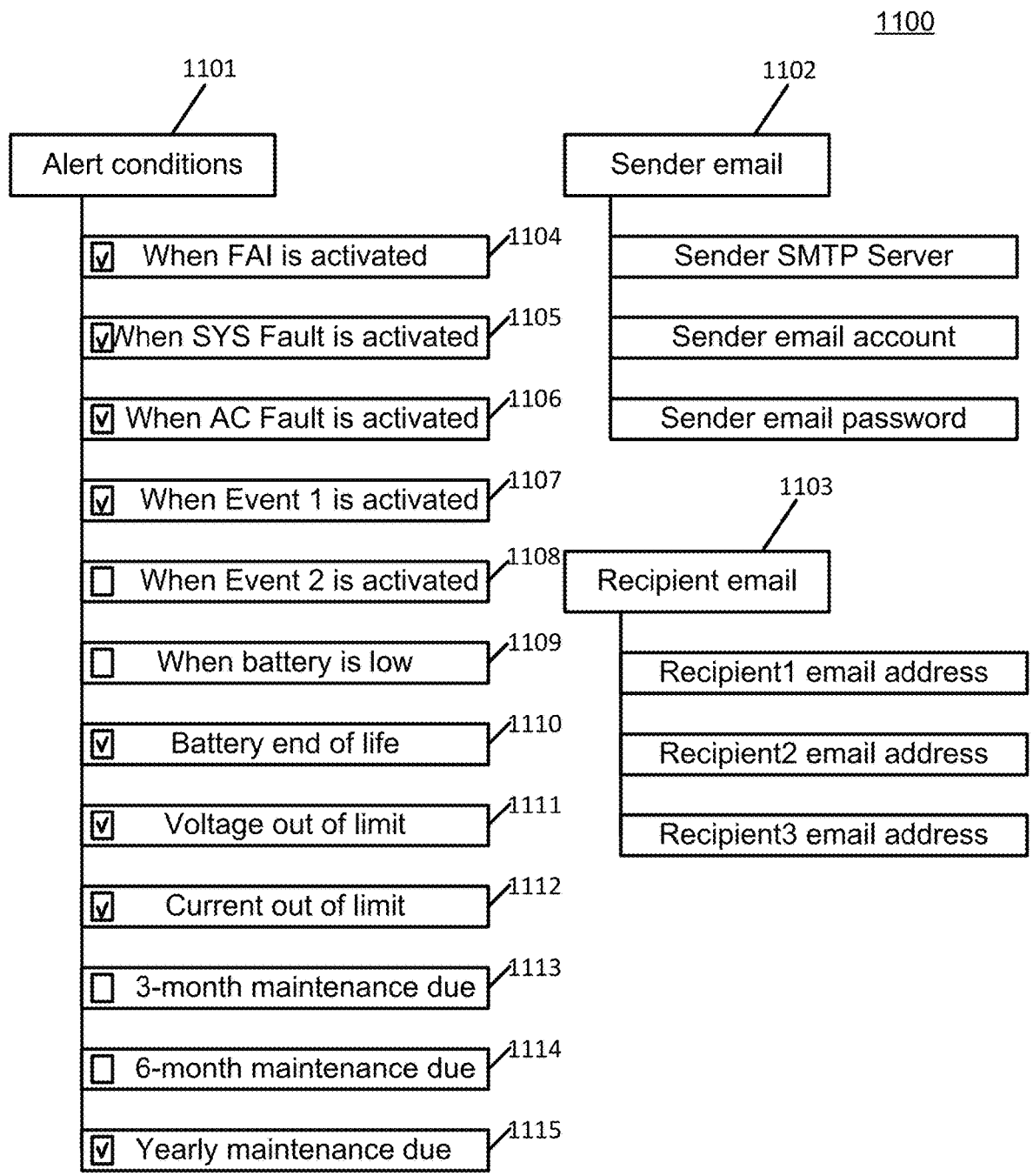
FIG. 11 is a diagram of an email setting page of the GUI in accordance with an embodiment.

Selecting the email setting button 1005 navigates to an email setting page 1100 shown in FIG. 11 where the system administrator can setup email alert trigger conditions 1101, email sender parameters 1102 including server name, email address and password, and recipients' email addresses 1103. If any of the email alert trigger conditions are met, emails with a parameter report as an attachment will be sent to the specified email recipients. When the trigger condition is removed (such as when a fault is cleared), the system will also send out email to notify the change of status.

The report setting button 1006 navigates to a report setting page 1200 which will be described with respect to FIG. 12. The report setting page 1200 allows the administrator to select the contents to be included in the parameter report attached to the email. MCU setting button 1007 navigates to an MCU settings page where the system administrator can assign installation specific names to the signals sensed by the MCU 509. The PWM setting button 1008 navigates to a page where the system administrator may setup the parameters of the two PWM channels on the data manager and interface logic 409. Battery setting button 1009 navigates to a page where the system administrator can setup battery diagnostic parameters. Logic output setting button 1010 navigates to a page that allows the system administrator to set the logic outputs on the data manager and interface logic 409 to a high or low level.

FIG. 11 provides an example of the email setting page 1100 which is accessed by selecting the email setting button 1005 on page 1000 shown in FIG. 10. A list of alert conditions 1101 is displayed which allows the system administrator to select, for example by checking or un-checking a checkbox next to each alert condition. For example, if the checkbox for 1104 "When FAI is activated" is checked, an email alert will be sent out if the control and access logic 405 received a Fire Alarm Interface (FAI) signal 329 from the Fire Alarm Control Panel (FACP) over the FAI interface 331. Similarly, if the checkbox for "When SYS Fault is activated" 1105 is checked, an email alert will be sent out when a System Fault occurs. If the checkbox for "When AC Fault is activated" 1106 is checked, an alert email will be sent out when an AC Fault is detected. The two input signals from external events connected to the power management system may be selected for alerts by checking the checkboxes for 1107 and 1108. If the 1107 or 1108 checkboxes are checked, then an alert email will be sent out when the related event is activated.

The "When battery is low" 1109 alert condition is obtained by the Device Data Handler module 531 of the data manager and interface logic 409. The Device Data Handler module 531 uses battery capacity, battery voltage and battery current-time integration to derive the "battery low" condition. For example, in one embodiment, if 1109 is selected, an email alert will be sent out when the battery 335 is discharged down to 20% capacity. Likewise in accordance with the embodiments the "Battery end of life" 1110 alert condition is derived by the Device Data Handler module 531 based on the user entered "battery life (years)" and recorded battery "hours of operation." If the "Battery end of life" 1110 condition is checked, an alert email will be sent out when the battery reaches the specified life entered in the battery setting page.

If the "Voltage out of limit" 1111 alert condition is selected, an alert email will be sent out when any one of the three ADC channel (of interfaces 343) readings exceeds a programmed upper or lower limit. If the "Current out of limit" 1112 alert condition is checked, an alert email will be sent out when any one of the three Hall current sensor (of interfaces 343) readings exceeds programmed upper or lower limit. If the "3-month maintenance due" 1113 alert condition is checked, an alert email will be sent out when 3 months has elapsed since last maintenance warning. If the "6-month maintenance due" 1114 alert condition is checked, an alert email will be sent out when 6 months has elapsed since last 6-month maintenance. If the "Yearly maintenance due" 1115 alert condition is selected, an alert email will be sent out when one year has elapsed since last yearly maintenance.

Various other email alert trigger conditions may be set in accordance with the embodiments. For example, the interfaces 343 shown in FIG. 5 may be used to designate various email alert trigger conditions. For example, any voltage sensed by the ADC inputs of interfaces 343, or a current sensed by Hall-effect sensors of interfaces 343 may be utilized. Maintenance reminder emails may also be programmed to go out at different length of intervals (in accordance to relevant safety regulations for the specific application). Additionally, periodic email with report attachment may also be sent during normal operating condition, in accordance with the embodiments. The period of the regular email report may be programmed by the system administrator.

As mentioned briefly above, selecting the report setting button 1006 on page 1000 as shown in FIG. 10 navigates to a report setting page. The report setting page 1200 is shown in FIG. 12. The report setting page 1200 allows the system administrator to select the parameters for each device (and the MCU 509 parameters) to be included in the report file. Table 4 provides an example list of the devices for which a parameter report can be configured in accordance with the embodiments.

TABLE 4

Configurable Device Reports Provided By The "Report setting" Page

| Device name | Device Description | Notes |
| --- | --- | --- |
| FP1 | Power supply board (#1) | |
| FP2 | Power supply board (#2) | |
| NAC1 | NAC power control board (#1) | |
| NAC2 | NAC power control board (#2) | |
| NAC3 | NAC power control board (#3) | |
| NAC4 | NAC power control board (#4) | |
| MCU | Data Manager and Interface Logic MCU | For variables sensed by the MCU. |

In addition to the capability of selecting a device on report setting page 1200, the specific parameters of the device to be sent in the report email are also configurable in accordance with the embodiments. For example, on the report setting page 1200, a device may be selected, for example FP1 1201. Selecting the FP1 1201 button navigates to an FP 1 parameter setting page 1300 shown in FIG. 13. The report setting page for device FP1 1300 displays information such as the device ID 1301 and a list of device FP1 parameters 1302. A selectable checkbox may be provided for each parameter as shown in FIG. 13. That is, to include a parameter into the report, the system administrator can check the corresponding checkbox for the desired parameter. Otherwise, the system administration can uncheck the checkbox to omit the parameter from the report. Checkbox 1303 toggles between checking all parameters in the list 1302 and un-checking all parameters in the list 1302.

FIG. 14 illustrates an example of an MCU parameter report setting page 1400. The MCU report setting page 1400 is arrived at by selecting the MCU button 1207 in the report setting page 1200 shown in FIG. 12. The MCU report setting page 1400 provides a site ID 1401 that is entered by the system administrator to identify the site where the power management system is installed. A list of the MCU parameters 1402 is provided with a checkbox for each parameter. Similar to the report setting page previously discussed, a parameter may be included into, or omitted from, the report by checking, or un-checking, the desired parameter's corresponding checkbox, respectively. A "check all/un-check all" toggle checkbox 1403 is also provided.

Figures 15, 16:
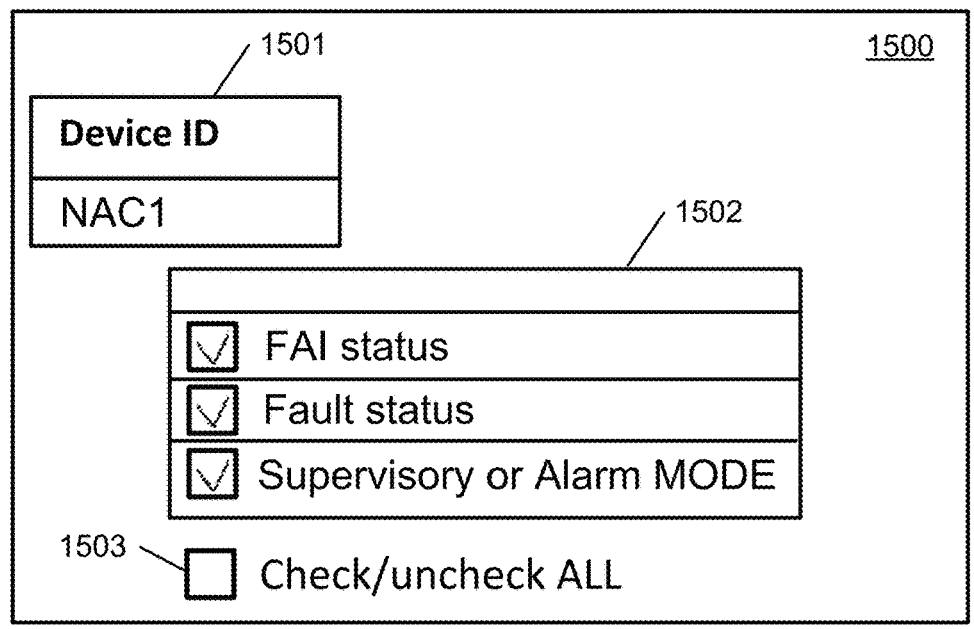
FIG. 15 is a diagram of a NAC device report setting page of the GUI in accordance with an embodiment.
FIG. 16 is a diagram of an MCU setting page of the GUI in accordance with an embodiment.

FIG. 15 provides an example parameter report setting page 1500 for device NAC1. The device ID 1501 is shown along with a list of NAC1 parameters 1502. Operation of the report setting page 1500 is similar to those already described, that is, there is a checkbox for each parameter. To include a parameter into the report, the system administrator can check the check box next to the desired parameter.

Otherwise, the system administrator can uncheck the check box. A "check all/un-check all" toggle checkbox 1503 is also provided.

FIG. 16 provides an example of an MCU setting page 1600 which is navigated to by selecting the MCU setting button 1007 in the configuration menu of configuration page 1000. The MCU setting page 1600 provides a list of MCU variables 1621 handled by the MCU and an assigned name column 1622 that allows entry of an assigned name for each variable. The assigned names may be entered when the power management system is installed in a job site. The system administrator can enter a site ID to identify the installation location. Exemplary variable names are shown in the assigned name column 1622 and the names provide examples of events or devices that may be monitored.

FIG. 17 provides an example of a "PWM setting" page 1700 and a "Logic output setting" page 1701. The PWM setting page 1700 is navigated to by selecting the PWM setting button 1008 on configuration page 1000, while the Logic output setting page 1701 is navigated to by selecting the logic output setting button 1010 on the configuration page 1000. The PWN setting page 1700 displays a PWM output channel number column 1751 and a frequency column 1752 that allows the system administrator to set the frequency through a pull-down list. For example, the pull-down list may provide multiple frequency choices ranging from 120 Hz to 20 kHz (based on an MCU internal PWM specification). A duty cycle column 1753 allows the system administrator to set the duty cycle. For example, a duty cycle range from 0% to 100% may be set where 0% sets the output to constant low level and 100% sets the output to constant high level.

The Logic output setting page 1701 displays a logic output channel column 1754 which shows the logic output channels. A set value column 1755 shows the logic output value, and the system administrator can select a "high" or "low" level through a pull-down menu as shown in FIG. 17.

FIG. 18 provides an example of a Battery setting page 1800 which is navigated to by selecting the battery setting button 1009 on the configuration page 1000. The battery setting page 1800 provides a column 1871 that allows the system administrator to select whether to activate a warning signal identified in a warning type column 1872. Column 1873 shows the battery parameters used to derive the warning signals. Column 1874 allows the system administrator to enter the battery parameters and column 1875 indicates the unit of the corresponding parameter value.

Figure 19:
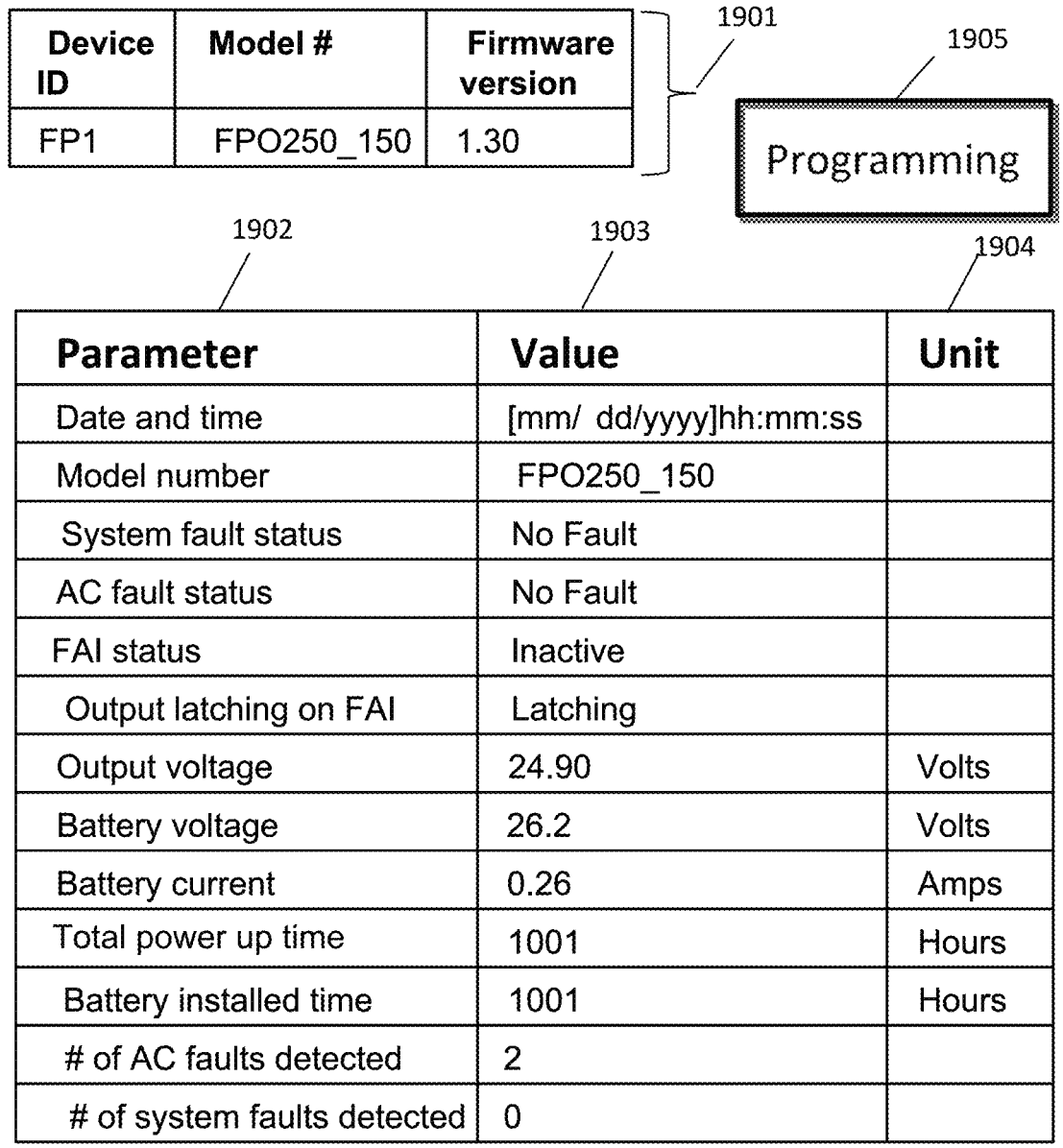
FIG. 19 is a diagram of a power supply/charger (FP1) real time parameters page of the GUI in accordance with an embodiment.
Figure 20:
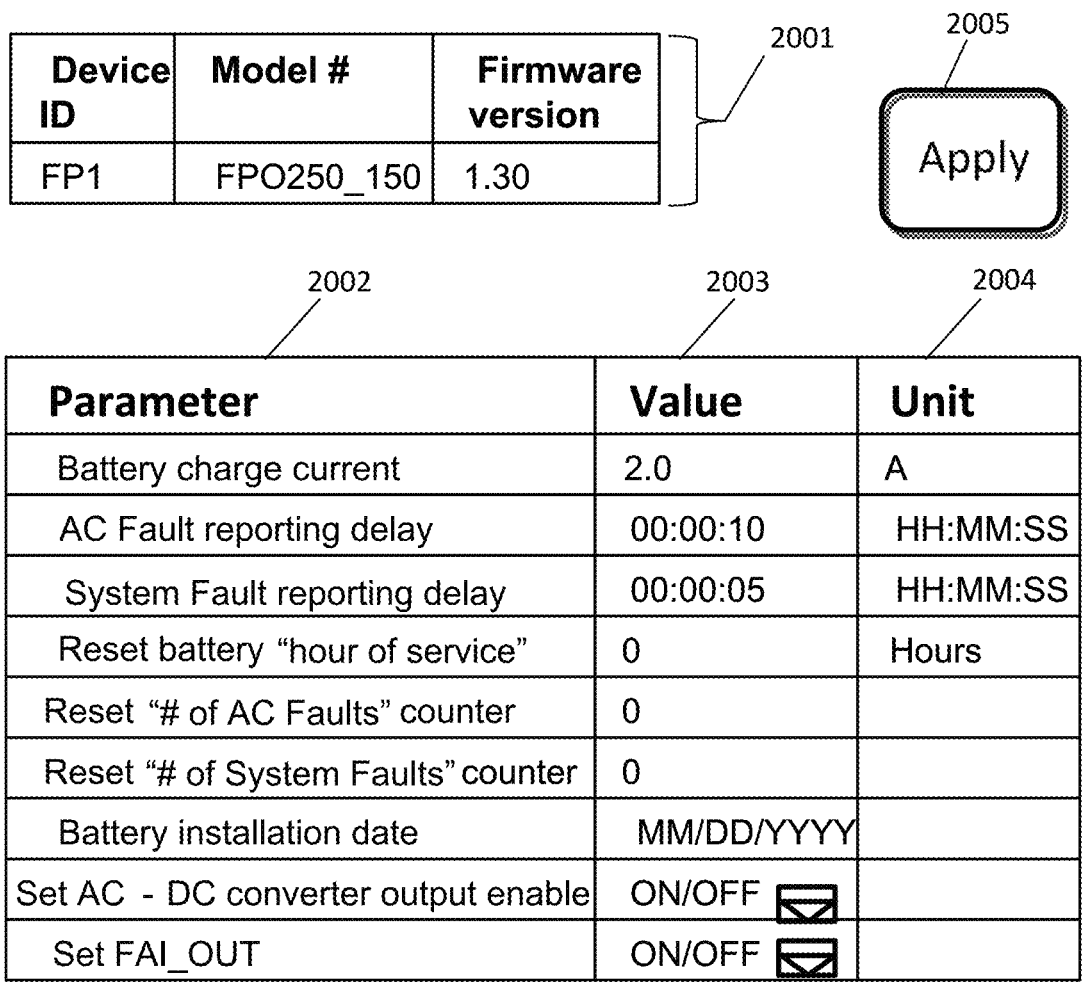
FIG. 20 is a diagram of a power supply/charger (FP1) programming page of the GUI in accordance with an embodiment.

FIG. 19 provides an example of an FP1 real time parameters page 1900. The FP1 real time parameters page 1900 is navigated to by selecting the FP1 button 904 on the initial page 900 shown in FIG. 9. A header block 1901 is displayed that provides the device ID, model number and firmware revision information. Also displayed on page 1900 is a parameter name column 1902, a current value column 1903, and a units column 1904. A programming button 1905 navigates to a programming page 2000 illustrated in FIG. 20.

The FP1 parameter programming page 2000 includes a header block 2001, and a column of programmable parameters 2002. The system administrator can enter values of the programmable parameters in value column 2003. A units column 2004 shows the units for the parameters. Selection of the "Apply" button 2005 causes the programmed parameters to be written into a microcontroller on the FP1 device. If the FP1 device is the main power supply/charger board 301 of the embodiments, the parameters will be written to the control and access logic 405.

FIG. 24 through FIG. 27 are related to operation of a DMC in accordance with various embodiments. FIG. 24 is a truth table describing how the output device, the output voltage and the GUI "Input Status" display responds to the "Control Input State," "Control Input Type," and "Output Load Type," when "Unlock on AC Loss" and "Unlock on FAI" are both disabled by the user (i.e. when the values set for these two parameters are all "NO"). The truth table of FIG. 21 includes column category headings 2110 that include "Input," "User Program Settings," and "Output." Each column also has a column heading 2120. The "Input" category includes only a column for "Control Input State." This is the control signal sent by an external control device, such as access control device, such as control input 461. This control input signal is passed to the power distribution controller 450 of the DMC 417 and can be either "Open" or "Closed."

Under "User Program Settings," one column is for "Control Input Type," which depends on the external control devices. Examples of control input types are "Normally Open" (NO) type and "Normally Closed" (NC) type. The Voltage (V) type is equivalent to the NO type, while the "Open Collector" (OC) type is equivalent to the NC type. Another column under "User Program Settings" is an "Output Load Type" column. Three example load types considered include "Fail Safe," "Fail Secure" and "Constant ON." Fail Safe and Fail Secure load types apply to magnetic locks and electrical strikes. For example, for a Fail Safe type, a door will be unlocked when the power to the lock is removed. For a Fail Secure type, the door will be locked when the power to the lock is removed (i.e. one needs to apply power to unlock it). Constant ON type applies to other loads that require continuous power output to operate such as, but not limited to, access control boards, card readers, CCTV cameras, video recorders and servers, network switches, etc.

Another column under "User Program Settings" is for "Unlock on AC Loss." This is a user entered parameter such that, if a user selects "Yes" for this parameter, the corresponding output will cause the door to be unlocked when the AC power is off (i.e when the system powered by battery backup). The last column under "User Program Settings" is for "Unlock on FAI" which is another user entered parameter. If the user selects "Yes," then the corresponding output will cause the door to be unlocked when an FAI signal is received by the DMC.

Columns under the column category heading "Output" include "Relay Coil Energize," "Output Voltage ON/OFF" and "Input Status Display." The "Relay Coil Energize" column represents a logic output from the power distribution controller 450 based on the truth table logic. That is, "ON" means the power distribution controller 450 will control a driver circuit to apply power to output device, which in this example is a relay coil. An "OFF" means that the power distribution controller 450 should not apply power to the relay coil. The "Output Voltage ON/OFF" column represents a logic output from the power distribution controller 450 based on the truth table logic where "ON" means there is power at the output, and where "OFF" means there is no power at the output. For example if NC contacts of a relay are used in the embodiments, then if the relay coil is not energized, the output of the corresponding channel will have voltage.

The "Input Status Display" column is for a logic output from the power distribution controller 450 based on the truth table logic where the result is either "Active" or "Inactive." This value is to be displayed on the DMC 417 data page of the GUI 323 on the remote device 319. The input is considered "Active" when the input type is NO and the input state is "Closed"; or the input type is NC and the input state is "Open."

All of the columns under "User Program Settings" are for user programmable values that may be entered using the GUI 323 on remote device 319. The power distribution controller 450 on DMC 417 will then subsequently execute the logic based on the truth table and deliver the correct output to drive the load. The power distribution controller 450 of the DMC 417 can be programmed for all the aforementioned input types and output load types from the GUI 323 using any remote device.

FIG. 22 is a truth table 2200 describing how the output device and output voltage responds to the FAI signal and to an AC power loss condition (i.e. when the battery backup is engaged). Similar to the FIG. 21 truth table, the truth table of FIG. 22 includes column category headings 2210 that include "Input," "User Program Settings," and "Output." Each column also has a column heading 2220.

Thus as can be seen in FIG. 22 under the "User Program Settings" category the user may make selections for "Unlock on FM" or "Unlock on AC Loss" using the GUI 323. These two parameters are given higher priority by the DMC 417 than the input state when one or both of the parameters are enabled (i.e. when set to "Yes" as shown in the FIG. 22 truth table).

Turning to the "Input" section of category headings 2210, an input column for "AC Loss" has possible values of "Yes" or "No" or is otherwise a "Don't care" value. An AC loss condition may be detected by the data manager and interface logic 409, and conveyed to the power distribution controller 450 of the DMC 417 using the interface 425. The column headings 2220 of the Input section also include "FAI Pin" which has possible values are "Low" or "High" or is otherwise a "Don't care" value. If a fire alarm is triggered, an FAI signal is sent to the power supply system from the FACP (Fire Alarm Control Panel) and the FAI input 433 to the DMC 417 will be a logic "Low" input value. Otherwise, for the non-alarm condition, the FAI input 433 provides a logic "High" value. In other words, the FAI input 433 uses negative logic in that it is logic "High" for normal conditions and logic "Low" for a fire alarm condition. The remaining Input column, "Control Input State;" the User Program Settings columns "Control Input Type," "Output Load Type;" and the "Output" columns "Relay Coil Energize" and "Output Voltage ON/OFF;" are all defined as discussed above with respect to the FIG. 21 truth table.

As further examples of operation when a fire alarm exists and the FAI Pin from the FACP provides a logic "Low" value to the DMC 417, two example truth table rows, row 2201 and row 2203 will now be discussed. Thus in row 2201, the FAI Pin is "Low" which means that a fire alarm signal is received. Also in row 2201, the Output Load Type is set to "Fail-Safe" and the "Unlock on FAI" setting is enabled. In this case, the relay coil is energized (i.e. "ON") and the output voltage is removed. In other words the Output Voltage is "OFF" because the relay (i.e. the output device) uses an NC contact meaning that energizing the relay coil causes the relay contact to open and remove the voltage. Since it is a Fail-Safe lock, the door will be unlocked in accordance with the user programming of the DMC 417. When the FAI input 433 is received by the DMC 417, the DMC 417 will send a signal to the data manager and interface logic 409 over the interface 425. The GUI 323 in the remote device 319 will show an FAI "Active" indication, for example, in red text. When a door is unlocked, the corresponding LED, of the power distribution channel status LEDs 418, will flash at a slow rate, for example, a rate of 1 Hz in some embodiments.

A second example is provided with respect to row 2203, which is the fourth row from the top of the FIG. 22 truth table. In row 2203, "AC Loss" is "Yes" meaning that AC loss has occurred and battery backup is being used. The User Program Setting "Unlock on AC Loss" is set to "Yes" and is thus enabled. The Output Load Type is set to "Fail-Secure." As seen in row 2203, the power distribution controller 450 will remove power to the output device (i.e. a relay coil in this example) and therefore "Relay Coil Energize" Output is shown as "OFF." In other words, the "Output Voltage" will be "ON" as shown in row 2203 and the door will be unlocked in accordance with the user's programming for the DMC 417. Put another way, even though the Output Load Type is "Fail-Secure" the user's program setting of "Yes" for "Unlock on AC Loss" with result in the door being unlocked when AC power is down and the system is using battery backup. Among other advantages, the programmability features of the DMC 417 on a channel-by-channel basis from a remote device 319 using the GUI 323 provides greatly enhanced ease-of-use and flexibility in the design of system operations and functions for various security system applications.

Figure 23:
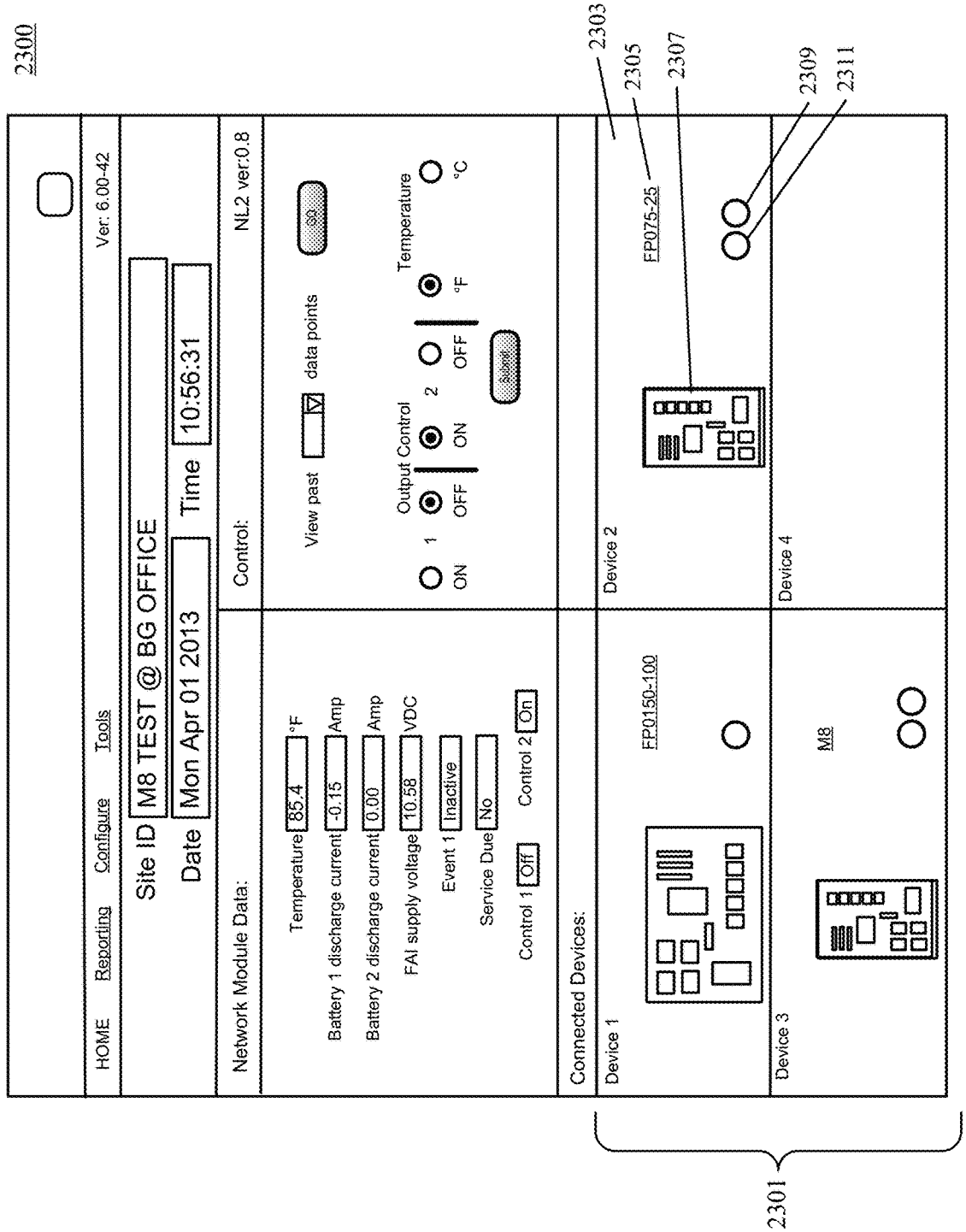
FIG. 23 is an example GUI home page for a networked power management system in accordance with some embodiments.

FIG. 23 provides one example of a GUI 323 Home page 2300 in accordance with an embodiment. The Home page is divided into sections or windows such as windows 2301 which is a section for connected devices. The windows 2301 display information for all devices connected to the data manager and interface logic 409. Each connected device window, such as example window pane 2303, may provide a device model name 2305, a picture of the device 2307, and colored status dots representing or emulating soft "LEDs." For example status dot 2309 may be a red dot that indicates when an FAI signal has been received (i.e. when a fire alarm is triggered). The status dot 2311 may be a green dot that indicates the device status is normal and that no fault condition is present. If a fault condition occurs, the status dot 2311 may change color from green to yellow to indicate a fault condition. The picture of the device 2307 may be selectable, for example by using a mouse or cursor click on the picture of a device 2307, to go to a data page of the GUI 323 for that device. Likewise the device model name 2305 may be a selectable link that also leads to the GUI 323 data page for that device.

An example of a GUI 323 device data page 2400 for the DMC 417 of a CPDC 435 is provided in FIG. 24. In one example, the DMC 417 may correspond to the "Device 3" window of windows 2301 shown in FIG. 23 and may be accessed by, for example, selecting the picture of Device 3 from the GUI 323 Home page 2300 as described above.

The data page 2400 may provide the device ID 2401, Model number 2403 and may indicate AC power status 2405 (i.e. whether AC is "ON" or "OFF" for the connected device). Every device connected to the data manager and interface logic 409 is identified by a device ID and thus the device ID 2401 is assigned by the data manager and interface logic 409. The Model number 2403 information is also passed to the data manager and interface logic 409 by the connected device. For example, the DMC 417 will provide Model number 2403 information to the data manager and interface logic 409 from the power distribution controller 450 over the interface 425. The AC power status 2405 is detected by the data manager and interface logic 409 and accordingly provided to the GUI 323 data page 2400. A selectable programming button 2417 may be selected by a user to enter the DMC 417 programming page 2500 illustrated in FIG. 25. A selectable return button 2419 returns the GUI 323 to the previous page, such as home page 2300.

The example GUI 323 device data page 2400 provides a table format having column headings 2410 and corresponding row and column data entries 2420. The leftmost column has the column heading "Output #" and displays the DMC 417 control output 419 channel numbers. A set of selectable checkboxes 2430 is provided with one selectable checkbox next to each the control output 419 channel number in the "Output #" column. By selecting an appropriate checkbox, a user may execute various operations related to the channel. An "Output Description" column allows users to enter a brief description for each control output.

The various column headings 2410 also include "Voltage (V)," "Current (A)," "Power (W)," "Power Ready," "Control Input," "FAI State," and "Output Status." The corresponding row and column data entries 2420 provide values and information where each row represents one of the control output 419 channels related to the description provided in the "Output Description" column. Thus the data entries 2420 for "Voltage (V)," "Current (A)" and "Power (W)" provide measured values from the DMC 417 for the given control output channel corresponding to its given row in the table.

The "Power Ready" column will display a "No" for channels of the DMC 417 where the DMC 417 senses a blown fuse or disconnected or missing jumper. The "Control Input" column displays the control input status of each control output channel corresponding to a table row. For example, if a control input status is shown as "Active", this may mean that an access controller providing an input to the DMC 417 is requesting to unlock a door. Conversely in this example, if the control input status is shown as "Inactive," it may mean that the access controller is requesting to lock the door.

In the "FAI State" column of the data page 2400, "Active" will be shown in red text if an FAI input 433 is received by the DMC 417. If no FAI signal is received, the FAI State will display "Inactive" in black text. The "Output Status" column of data page 2400 will show "Normal" in green text when no fault condition exists, and will show the status as "Fault" in yellow text if a fault condition occurs.

In accordance with the embodiments, a user may operate the GUI 323 to selectively enable or disable any individual control output 419 channel of the DMC 417. When a control output 419 channel is disabled, the output voltage will be removed. When a control output 419 channel is enabled, the output of that channel will follow the truth tables of FIG. 21 and FIG. 22. More particularly, disabling and then enabling a channel again enables users to reset any frozen device without affecting the other devices powered by the same power supply system. The selectable "Enable Selected Output" button 2407 allows a user to enable selected output channels, where the user selected appropriate checkboxes 2430 next to the control output channel numbers that are to be enabled. That is, the selected control output channel numbers are enabled together as a group by using the "Enable Selected Output" button 2407. Similarly, selected control output channel numbers may be disabled by using the selectable "Disable Selected Output" button 2409. When a control output channel is disabled, the "Output Status" in the corresponding table row of the GUI 323 data page 2400 will be shown as "Not Used," and the appropriate LED of the power distribution channel status LEDs 418 on the DMC 417 will be turned off The selectable "Enable All Output" button 2411 and the selectable "Disable All Output" button 2413 enable the user to globally enable or disable all control output channels of the DMC 417, respectively. A selectable "Save Setting" button 2415 allows a user to save the entries in the "Output Description" column. The selectable "programming" button 2417 navigates to the DMC 417 programming page 2500 shown in FIG. 25.

The DMC 417 programming page 2500 is one example of a programming page in one example embodiment of the GUI 323. The programming page 2500 also provides a table format with column headings 2520. A selectable "Return" button 2509 navigates back the data page 2400 of FIG. 24. Other selectable buttons include a "Save Setting" button 2501, "Fill All" button 2503, "Export Setting" button 2505 and "Import Setting" button 2507. The "Save Setting" button 2501 saves any content that the user has entered in the programming page 2500. The "Fill All" button 2503 is a page wide "Fill All" button that copies the parameters entered in the first row of the table to every other row below. The "Export Setting" button 2505 allows the user to export the current DMC 417 settings entered in the programming page 2500 to a file. The "Import Setting" button 2507 allows the user to import a previously saved DMC 417 setting by importing the settings from a stored file.

The programming page 2500 table format has the column headings 2520 which include "Output #," "Control Input Type," "Output Load Type," "Unlock on FAI Activation," "Unlock on AC loss," "Email Alert on Fault," "Voltage Lower Limit (V)," "Voltage Upper Limit (V)," "Current Lower Limit (A)" and "Current Upper Limit (A)." The "Output #" column lists all available control output channel numbers. The "Control Input Type" column allows entry of the control input type for each channel and provides a pull-down menu for selecting one of the valid control input types such as Normally Open (NO), Normally Closed (NC), Voltage (V) and Open Collector (OC) control input types. Another selectable option in the pull-down menu is a special type, "Disabled," that when selected results in the input state having no effect on the corresponding control output. The "Output Load Type" column allows entry of valid load types using a pull-down menu where the valid load types include "Fail-Safe," "Fail-Secure," and "Constant ON". When the "Output Load Type" is selected as "Constant ON," the "Control Input Type" entry is automatically defaulted to the "Disabled" entry in the "Control Input Type" column.

The "Unlock on FAI Activation" allows the user to select whether to unlock the door when the FAI signal is received. The "Unlock on AC loss" column allows the user to select whether to unlock the door when the AC power is lost and system is running on battery power. The "Email Alert on Fault" column allows users to select whether an alert email will be sent out to preprogrammed recipients when a fault condition occurs. If a user enters "Yes" for this setting on a particular output control channel, an email will be sent out when a fault has occurred on that channel.

Figure 25:
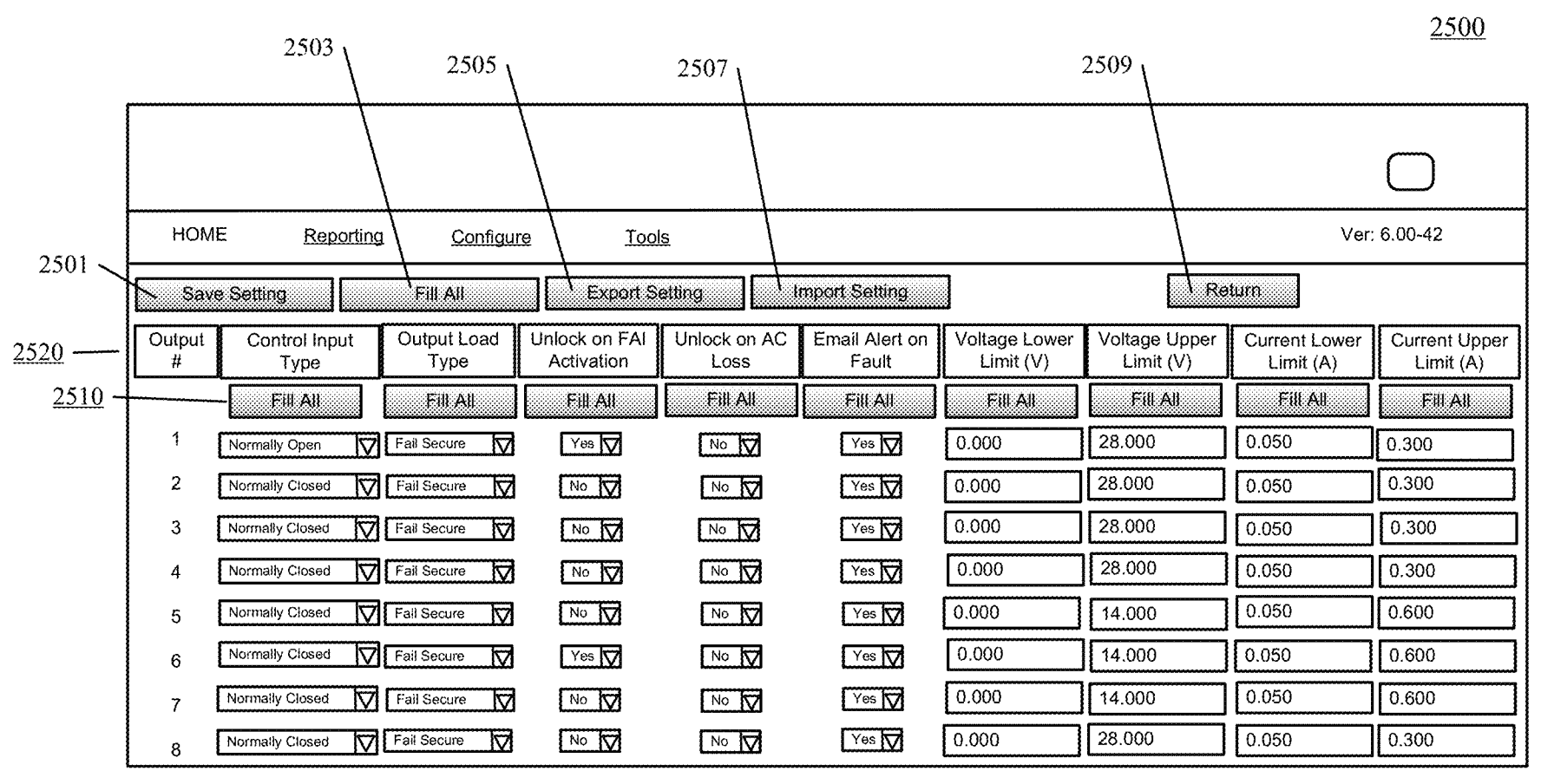

The "Voltage Lower Limit (V)," "Voltage Upper Limit (V)," "Current Lower Limit (A)" and "Current Upper Limit (A)" columns allow the user to enter the corresponding voltage and current limit values for each output control channel. If a designated output parameter (voltage or current) exceeds the user specified limit, a fault signal is generated for that channel. The corresponding "Output Status" entry in the DMC 417 data page 2400 will display "Fault" in yellow text. Also the corresponding LED of the control output 419 power distribution channel status LEDs 418 on DMC 417 device will flash at a faster rate, for example a rate of 4 Hz. As shown in FIG. 25, each column of the programming page 2500 table format has a corresponding per column selectable "Fill All" button 2510 which, when selected, copies entries from the first row of the corresponding column to every below row entry of the column.

Figure 26:
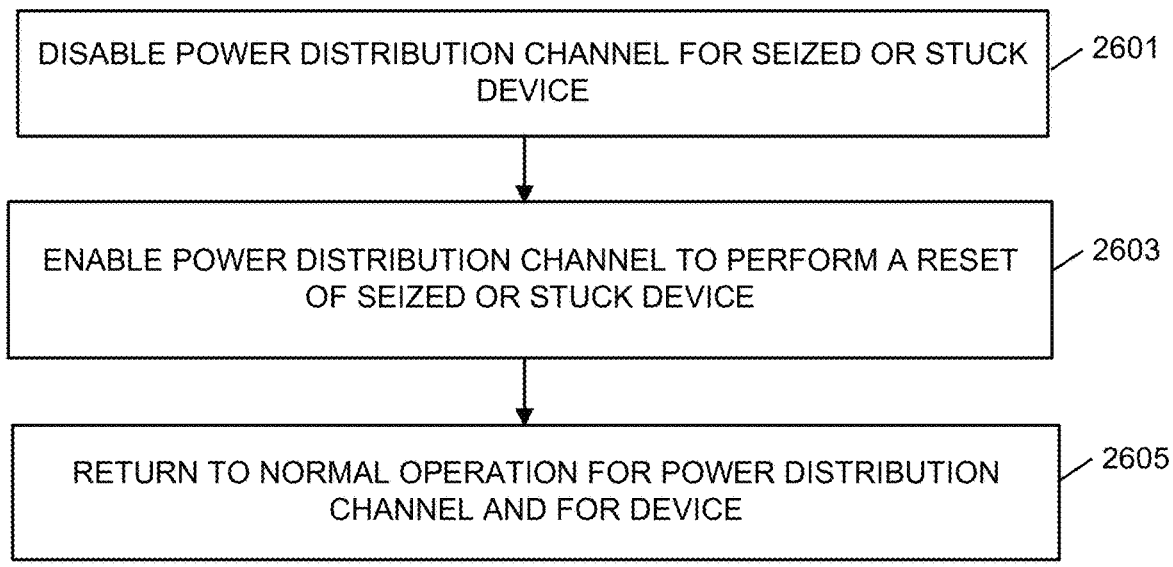
FIG. 26 is a flow chart of a method of operation for remote reset of a device using a power distribution channel in accordance with an embodiment.
Figure 27:
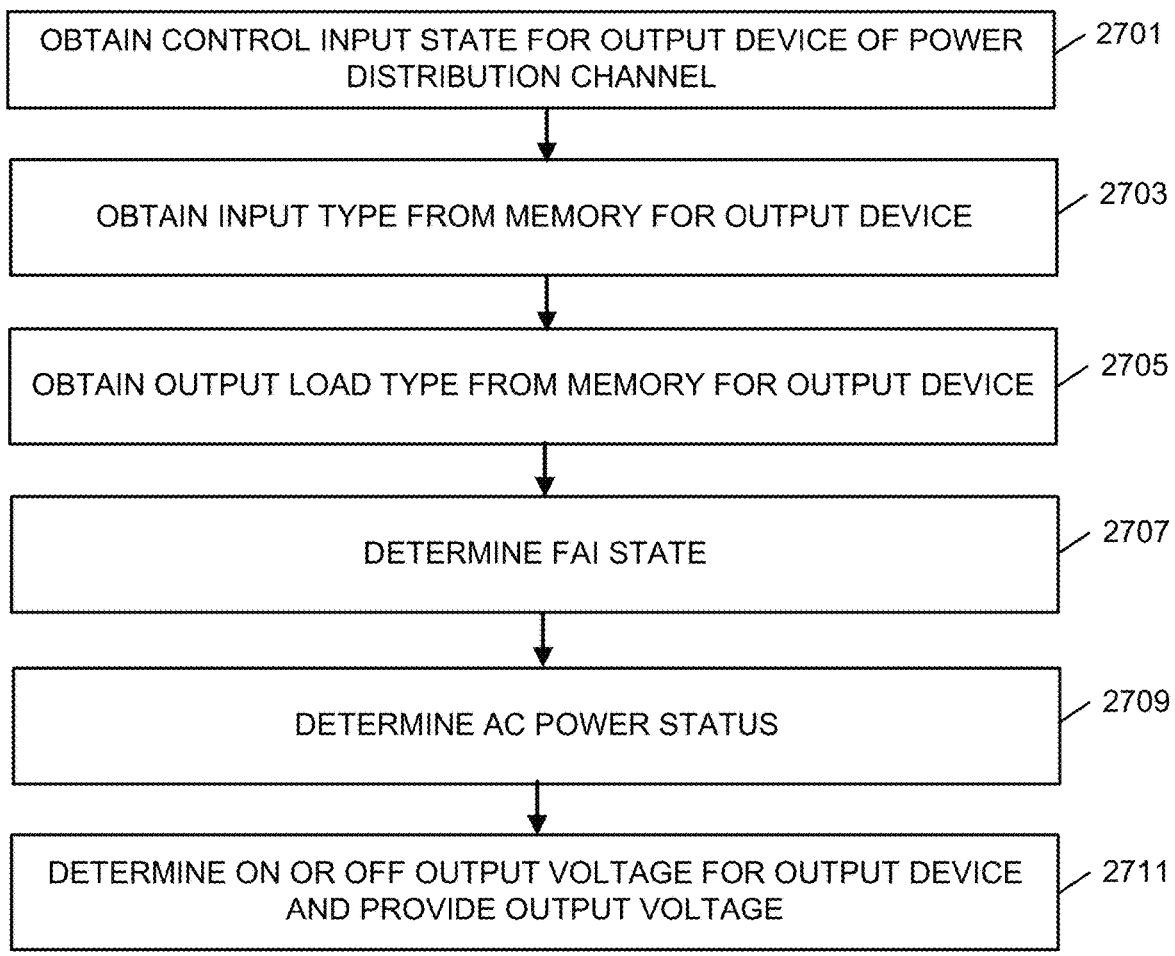
FIG. 27 is a flow chart of a method of operation for providing a control output using a power distribution channel in accordance with an embodiment.

The methods of operation of the DMC 417 and the GUI 323 described above in detail are summarized by the flowcharts of FIG. 26 and FIG. 27. Thus, in FIG. 26 operation 2601, power may disable for a power distribution channel where a controlled device is seized or stuck and requires a reset. In operation 2603, power to the selected power distribution channel may be enabled to perform a reset of the seized or stuck device. In 2605, the power distribution channel and the controlled device return to normal operation. All of the operations of the FIG. 26 flowchart may be accomplished by controlling the channels of the DMC 417 via the GUI 323 on any remote device 319.

The flowchart of FIG. 27 illustrates how the DMC 417 controls the output voltage for the control output on a power distribution channel. In 2701, the DMC 417 obtains the control input state related to an output device of the power distribution channel. The input type for the output device in obtained from memory as shown in operation block 2703. The output load type of the controlled device is also obtained from memory for the output device as shown in operation block 2705. The FAI state is determined in block 2707 and the AC power status is determined in block 2709. The AC power status is determined by the data manager and interface logic 409 and provided to the DMC 417 power distribution controller 450 over the interface 425. In block 2711, The DMC 417 then determines the on or off output voltage for the output device and provides the output voltage so that the corresponding control output 419 provides the appropriate output voltage to the controlled device.

It is to be understood that the GUI 323 pages described above and illustrated in FIG. 9 through FIG. 25 are exemplary only and that other various configurations, that is, various layouts of the pages is possible and such varying configurations and/or layouts would remain within the scope of, and in accordance with, the embodiments herein disclosed.

The present disclosure further provides a computer readable memory, that includes executable instructions for execution by at least one processor, that when executed cause the at least one processor to perform the various operations described above with respect to the control and access logic 405 or the CPDC 435, or the DMC 417. The present disclosure further provides a computer readable memory, that includes executable instructions for execution by at least one processor, that when executed cause the at least one processor to perform the various operations described above with respect to the data manager and interface logic, the CPDC or the DMC. The computer readable memory executable instructions, when executed may further cause the one or more processors to send the various pages related to GUI 323 to a remote device.

A computer readable memory may store the various software/firmware described above and may be any suitable non-volatile memory such as, but not limited to programmable chips such as EEPROMS, flash ROM (thumb drives), compact discs (CDs) digital video disks (DVDs), etc., that may be used to load executable instructions or program code to devices such as, but not limited to, those described in further detail herein.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. An apparatus comprising:

a first processor operatively coupled to a first set of interface ports comprising DC voltage input ports and current input ports, the first processor operative to convert DC voltage and current analog data to DC voltage and current digital data;

a second processor operatively coupled to the first processor, to a second set of interface ports, and to at least one network interface port, the second processor operative to:

obtain digital data via the second set of interface ports and obtain DC voltage and current digital data from the first processor;

obtain device operating parameters and alert condition notifications related to device faults or potential device failure for a plurality of digital and analog devices, from the digital data and the DC voltage and current digital data;

obtain updates to operating parameters from a remote device over the at least one network interface port;

provide updates to device operating parameters over the second set of interface ports; and a power supply board comprising:

an AC-to-DC power supply and a battery charger operatively coupled to the power supply; and a third processor, operatively coupled to the battery charger and to the second processor via one of the second interface ports, the third processor operative to:

obtain battery charger programming commands from the second processor, and update battery charger data in response to the programming commands;

monitor the power supply and the battery charger for fault conditions;

switch a power bus to battery power in response to a power supply fault condition or loss of AC power;

send control commands to local fault reporting devices in response to detection of a fault condition; and enable the second processor access to fault report data corresponding to the fault condition.

2. The apparatus of claim 1, comprising:

an SNMP (Simple Network Management Protocol) agent, executable by the second processor, operative to write and email a report conforming to a plurality of configurable report settings in response to occurrence of a device alert condition.

3. The apparatus of claim 1, comprising:

a web server, executable by the second processor, operative to provide a user interface accessible by a remote device via the network interface port connected to the Internet, such that the remote device can receive data from, and provide programming outputs for, connected devices operatively coupled to the second processor via the second interface ports.

4. The apparatus of claim 1, wherein the second processor is further operative to:
- detect and identify each device operatively coupled via the first set of interface ports and the second set of interface ports;
- determine an alert condition for each device; and
- write and email an individual report for each device in response to occurrence of a corresponding determined device alert condition for a corresponding device.

5. A distribution monitor and control (DMC) board, operative to receive DC power inputs from each of a plurality of power supply boards, the DMC board comprising:
- a plurality of DC power buses, each DC power bus corresponding to a power supply board DC power input;
- a set of power distribution channels, each power distribution channel operatively coupled to one of the DC power buses, and comprising a control input terminal and an output device having a control output terminal, the output device operative to provide a control output signal at the control output terminal to control a plurality of external device types; and
- a controller, operatively coupled to each power distribution channel, the controller operative to:
  - receive a control input signal received at the control input terminal for a corresponding power distribution channel, with each control input signal being a control input signal selected from a group consisting of: a normally closed contact input, a normally open contact input, an open collector input, and a direct voltage input;
  - control the corresponding output device of the corresponding power distribution channel to provide the control output signal at the control output terminal in response to the control input signal; and
  - isolate each power distribution channel individually by controlling the corresponding output device to remove the control output signal.

6. The DMC board of claim 5, where the plurality of power supply boards each comprises:
- an AC-to-DC power supply;
- a battery charger operatively coupled to the power supply; and
- a processor operatively coupled to the battery charger.

* * * * *